United States Patent [19]
Sasa et al.

[11] Patent Number: 5,606,212
[45] Date of Patent: Feb. 25, 1997

[54] ROTOR OF ROTARY ELECTRIC-MACHINE

[75] Inventors: Chikage Sasa, Tachikawa; Michiyuki Abe, Tokyo; Akihiro Matumoto, Nishinasuno-machi; Shin-ichi Okazaki, Yokohama; Chisato Shibata, Yokohama; Yoshikiyo Nishikawa, Yokohama, all of Japan

[73] Assignee: Kabushiki Kaisha Toshiba, Kawasaki, Japan

[21] Appl. No.: 245,035

[22] Filed: May 17, 1994

[30]     Foreign Application Priority Data

May 17, 1993 [JP] Japan ................................. 5-114979

[51] Int. Cl.⁶ ............................................................. H02K 3/46
[52] U.S. Cl. ........................... 310/270; 310/260; 310/194
[58] Field of Search ................................... 310/194, 260, 310/270

[56]     References Cited

U.S. PATENT DOCUMENTS

| | | | |
|---|---|---|---|
| 3,558,950 | 1/1971 | Rayhould | 310/270 |
| 3,991,334 | 11/1976 | Cooper et al. | 310/260 |
| 4,016,443 | 4/1977 | Johnson | 310/260 |

FOREIGN PATENT DOCUMENTS

| | | |
|---|---|---|
| 609652 | 11/1960 | Canada. |
| 279752 | 3/1990 | Japan. |
| 2219430 | 9/1990 | Japan. |
| 4193043 | 7/1992 | Japan. |

OTHER PUBLICATIONS

CIGRE 1988, session 11–03, 28th Aug. – 3rd Sep. by S. Hayashi, E. Haraguchi, T. Sanematsu, N. Takahashi Y. Yasaka and O. Nagura. Development of Adjustable Speed Generator / pp. 1 & 2.

CIGRE 1992, session 11–104, 30th Aug.–5th Sep. by S. Furuya, S. Fujiki, T. Hioki, T. Yanagasawa, S. Okazaki and S. Kogayashi. Development and Achieved Commerical Operation Experience of the World's First Commissioned Converter–Fed Variable–Speed Generator–Motor for a Pumped Storage Power Plant / pp. 1–9.

*Primary Examiner*—Steven L. Stephan
*Assistant Examiner*—Jonathan Link
*Attorney, Agent, or Firm*—Oblon, Spivak, McClelland, Maier & Neustadt, P.C.

[57]     ABSTRACT

A rotor of a rotary electric-machine according to the present invention includes a rotor core, a distributed winding wound around the rotor core, a ring member arranged at an end of the rotor core in the axial direction and having an outside diameter which is substantially equal to the outside diameter of the rotor core, and a coupling member for coupling an end portion of the distributed winding to the ring member. The ring member has a plurality of rings arranged at both ends of the rotor core in the axial direction. The rings are arranged one above another. The coupling member has a leading member with a curved portion for leading the end portion of the distributed winding toward the center of the rotor core and a fixture for fixing the leading member into an inner peripheral portion of the ring member.

12 Claims, 16 Drawing Sheets

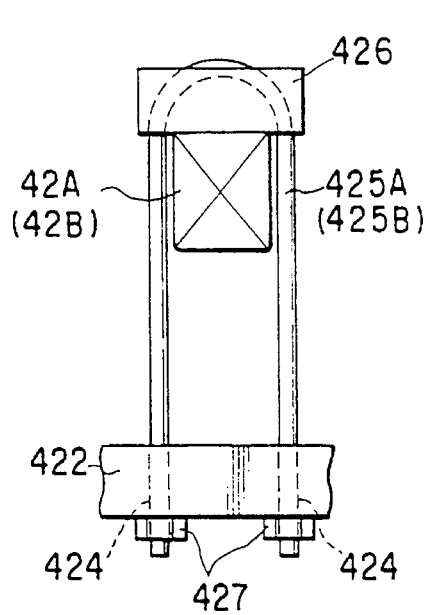
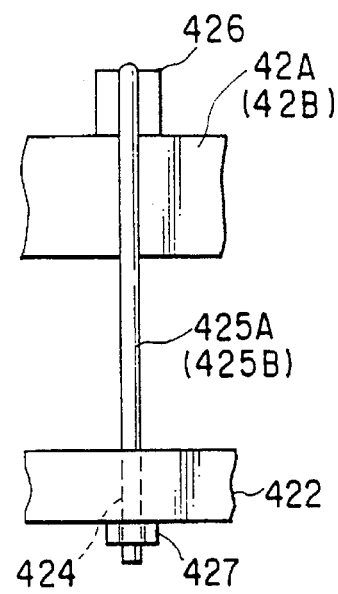
PRIOR ART
FIG. 4A
PRIOR ART
FIG. 4B
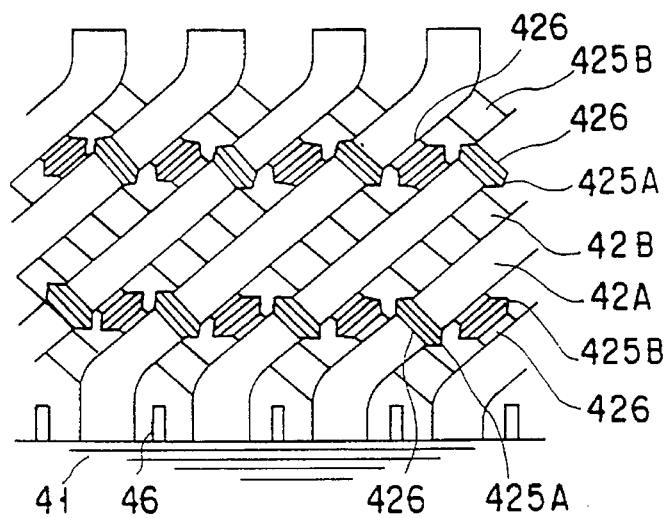
PRIOR ART
FIG. 5

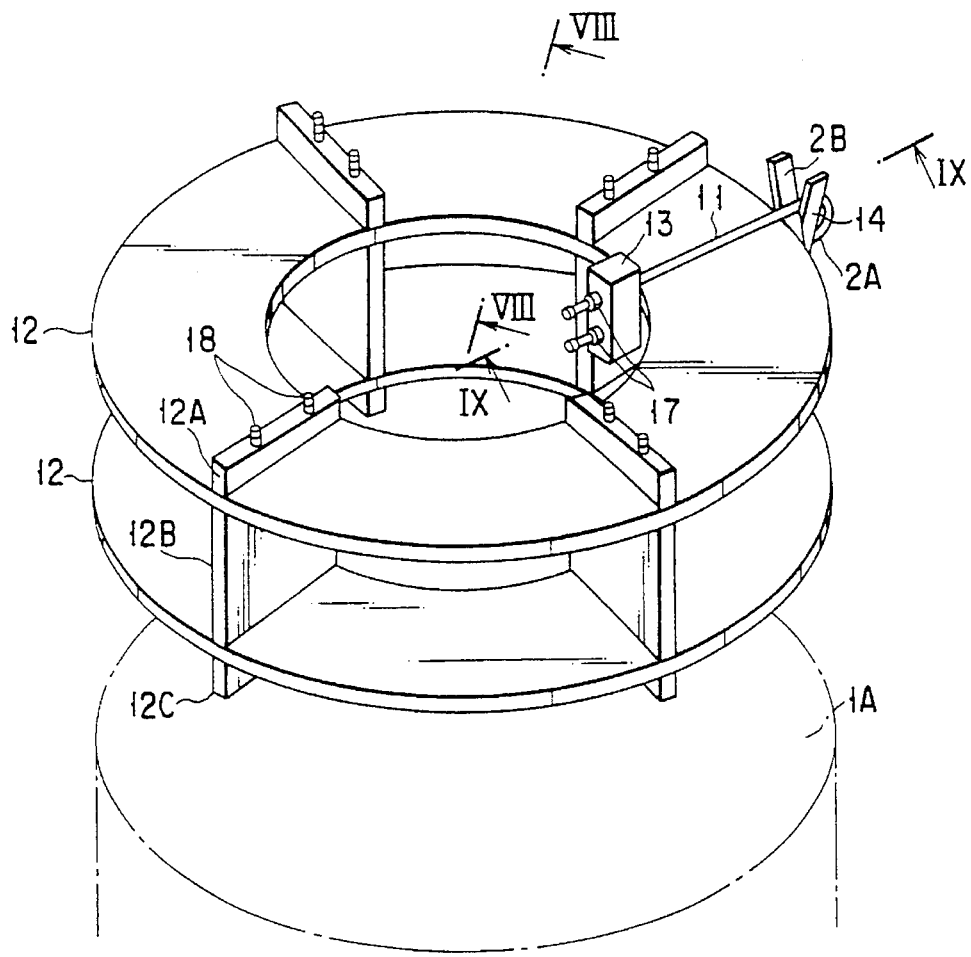
F I G. 10
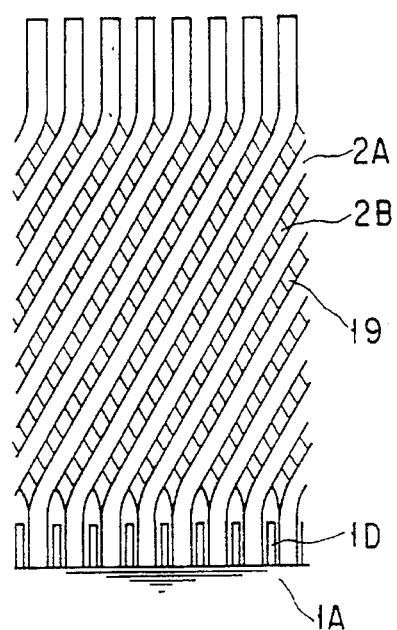
F I G. 11

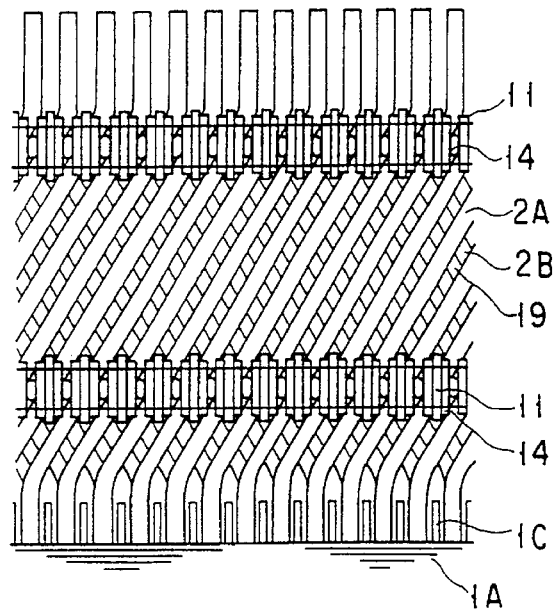
F I G. 12
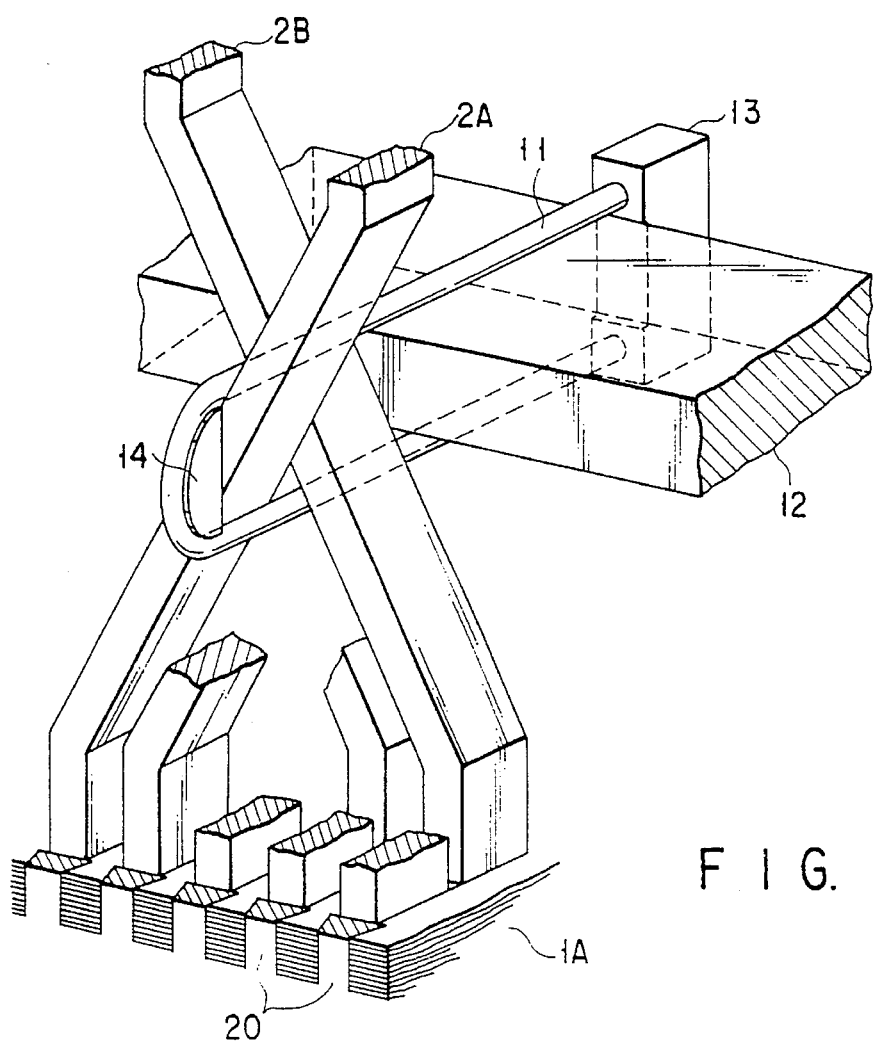
F I G. 13

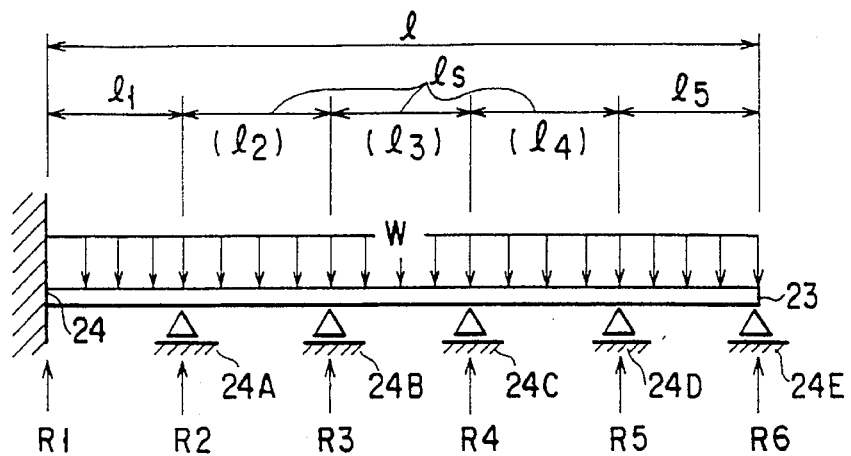
F I G. 23
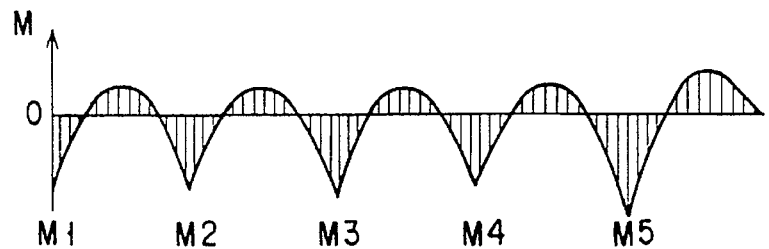
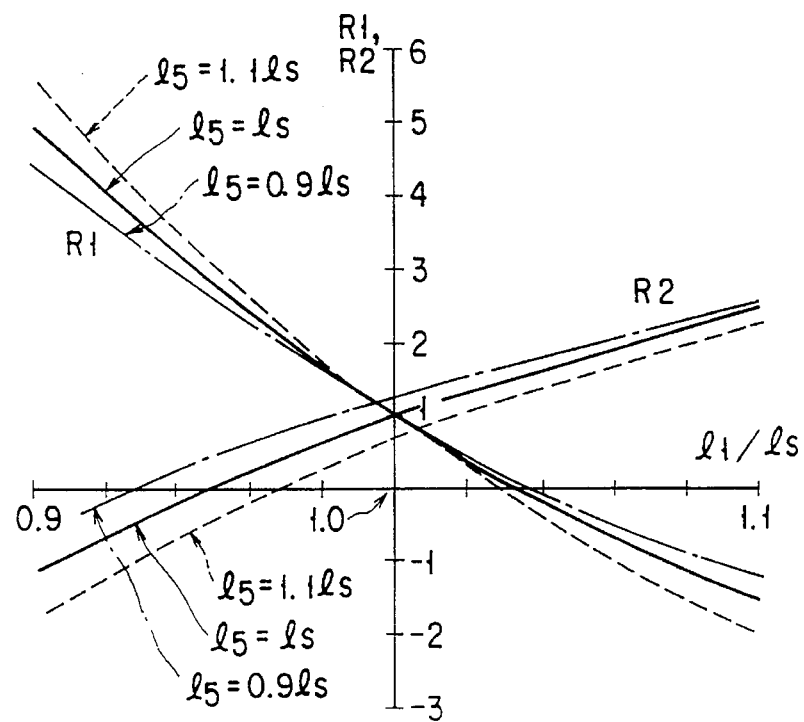
F I G. 25

ROTOR OF ROTARY ELECTRIC-MACHINE

BACKGROUND OF THE INVENTION

1. Field of the Invention

The present invention relates to a rotor with distributed windings used in a rotary electric-machine of an electric plant such as a variable-speed pumped storage generating system, presently under development, a variable-speed flywheel generating system, a variable-speed reactive power phase modifying system and a variable-speed frequency converting system which will be developed in future.

2. Description of the Related Art

The development of pumped storage power stations has greatly progressed recently as the demand for electric power increases, and has contributed to keeping a balance between the supply and demand for power. However, the demand for power increases every day, as does the amount of electricity generated by nuclear power plants. Thus, the need to control this power and use it efficiently, for example, at midnight and during holidays is enhanced. To meet this need, a variable-speed pumped storage generating system involving the latest power electronics technology and large-sized rotary machine technology has been put to practical use.

The variable-speed pumped storage generating system creates the following operational advantages unobtainable from conventional power generating systems: the frequency can be controlled to absorb variations in the demand for power in the pumping operation; power generating efficiency is improved; a power system can be stabilized since its input/output control can be executed instantaneously using the rotation energy of a rotor; the voltage of a power system can be maintained and stabilized since reactive power is controlled quickly and widely, etc.

For a generator/motor of the variable-speed pumped storage generating system, a rotating magnetic field, which rotates at a slip speed, has to be formed on the rotor. To do so, a three-phase distributed winding is wound on the rotor, as it is wound on a stator. This rotor has the same structure as that of a rotor of a wound-rotor type induction motor.

The largest amount of power generated from the conventional wound-rotor type induction motor in Japan is 27 MW. The diameter of the rotor of this induction motor is 3.3 m, and the core length thereof is 1.1 m. In contrast, a variable-speed generator/motor capable of generating power of 85 MW and 310 MW have been already manufactured. The rotor of the 85 MW generator/motor has a diameter of about 7 m and a core length of about 2 m, and that of the 310 MW generator motor has a diameter of about 5.5 m and a core length of about 4 m.

While the maximum peripheral speed of the rotor is about 100 m/s in the wound-rotor type induction motor, that of the rotor is 110 to 130 m/s in the variable-speed generator/motor. In the variable-speed generator/motor, the synergism of the increase in generated power and size of rotor winding (the sectional area of which is four to five times as large as that of the conventional winding) causes the centrifugal force exerted upon the rotor winding on the rotor to be ten or more times as much as that of the conventional rotor.

The most important object to be attained in order to manufacture a variable-speed generator/motor involving a rotor which has never been seen before, is to resolve various problems regarding a device for supporting the centrifugal force exerted upon the end portion of the rotor winding of the rotor which has a larger diameter and a higher peripheral speed than that of the wound-rotor type induction motor.

More specifically, by supporting the centrifugal force using an efficient supporting device, the stress generated at the winding end portion has to be leveled and reduced to maintain a good insulation state in the winding for a long time. As is already known, in the conventional wound-rotor type induction motor, a nonmagnetic steel wire or the like is wound around the winding at its end portion to support the centrifugal force generated thereon, and the rotor winding end portion is thus supported by the tension caused by the winding of the nonmagnetic steel wire.

Various other objects, features and attendant advantages of the present invention will be more fully appreciated as the same becomes better understood from the following detailed description when considered in connection with the accompanying drawings in which like reference characters designate like or corresponding parts throughout the several views and wherein:

FIG. 1 is a view showing the appearance of a rotor of the above-described wound-rotor type induction motor, and FIG. 2 is an enlarged detailed sectional view of rotor winding end portions.

Referring to FIG. 1, a cylindrical rotor 1 includes a rotor core 1A, a rotating shaft 6, and a nonmagnetic steel binding wire 26. As illustrated in FIG. 2, the rotor 1 also includes a supporting ring 27, spacers 28A and 28B, a stator core 29, and a stator winding 30. A space $G_L$ is formed between the rotor core 1A and stator core 29. As shown in FIG. 2, rotor winding end portions 2A and 2B are fixed in the rotor core 1A by a wedge (not shown). The binding wire 26 is wound around the peripheries of the winding end portions 2A and 2B projected from the end of the rotor core 1A. The centrifugal force exerted upon the winding end portions 2A and 2B during the rotation of the rotor is therefore supported by the tension of the binding wire 26.

If the above mechanism is applied to a variable-speed generator/motor which is larger in size and higher in peripheral speed than the wound-rotor type induction motor, the following drawback will arise. Since, as described above, the centrifugal force acting on the rotor winding is ten or more times as much as that in the conventional case, the number of times the binding wire 26 is wound needs to be increased. However, the rotor is made to pass through the ring-shaped stator core 29 when the generator/motor is installed, so that the outside diameter of each rotor winding end portion has to be smaller than the inside diameter of the stator core 29, which places restrictions on the number of windings of the binding wire 26. As the rotor is increased in power and speed, the elastic deformation of the binding wire 26 becomes greater, and the winding end portions are displaced widely and thus cannot be supported sufficiently.

As shown in FIG. 2, the winding end portions 2A and 2B are covered with the binding wire 26 and supporting ring 27 and, in this case, the current flowing through the rotor windings of the wound-rotor type induction motor is small, and the amount of heat generated therefrom is also, in accordance, small. For this reason, there occurs no problem in cooling even though the winding end portions 2A and 2B are covered with a supporting structure.

Since, however, the variable-speed generator/motor generates high power, a large amount of current flows through the rotor windings, and a large amount of heat is generated. If the heat is prevented from radiating by a supporting structure, there occurs problems relating to overheating and the deterioration of insulation, thus requiring a supporting device with good ventilation which does not prevent heat radiation.

The foregoing drawbacks will occur if the technique of supporting the rotor winding end portions is applied to a large-sized, high-power, variable-speed generator/motor. Even though the technique of the conventional device for supporting the winding end portions, which is employed in a small-sized, low-power, induction motor, is applied to the variable-speed generator/motor, a desired function is not fulfilled, and the reliability of the supporting device is greatly reduced. In view of this, the need to develop an excellent supporting device has increased.

Furthermore, the conventional supporting device has the following drawback regarding the assembly and installation of the variable-speed generator/motor. When the aforementioned supporting device, on which the binding wire is wound, is applied to the variable-speed generator/motor, a winding device including a rotating unit and a tension generating unit is required to wind the binding wire during assembly of the rotor.

FIGS. 3A and 3B are views showing a method for winding the binding wire on the rotor of the wound-rotor type induction motor. As shown in FIGS. 3A and 3B, the rotor 1 is supported by a temporary shaft 31 received by temporary bearings 32A and 32B. When the binding wire 26 is wound around the rotor 1, the rotor is rotated through a drive belt 33A driven by a rotating unit 33, and a tension generating unit 34 applies appropriate tension to the binding wire. An operator works on a workbench 35.

As is apparent from FIGS. 3A and 3B, the area of the floor necessary for the winding operation is several times as large as the projected area of the rotor. In the wound-rotor type induction motor, however, the area of the floor is not important since the winding operation is performed in its dedicated space of a plant.

By contrast, since the rotor of the variable-speed generator/motor is large in size, its component parts are transported from a factory to a power station, and assembled into the rotor in an assembly room of the power station. If, therefore, the conventional supporting device is adopted, the floor of the assembly room has to be enlarged in the power station, in view of the winding operation.

The generator/motor is installed in an underground hydroelectric power station in relation to a water power site. Therefore, a large assembly room occupied in the power station increases the cost of excavation.

The time required for installing a generator/motor in a power station, will now be described. In general, a high revolution speed (400 rpm or more) rotary electric-machine generating electric power of 300 MW, which is one of the conventional constant-speed generator/motors, can be assembled in about nine months, whereas a rotor of the machine can be assembled in about a third of that time. Since the assembly of the rotor is performed, together with the assembly of a stator and the like, the time needed to assemble the rotor exercises no influence on the total time required to assemble the machine.

In a variable-speed generator/motor generating an electric power of 300 MW, a rotor having a device for supporting a winding end portion on which a binding wire is wound, is assembled in about nine months. This period is as long as the total time needed to assemble the constant-speed generator/motor and is mainly due to the time necessary for winding the binding wire on the winding end portion of the rotor. For this reason, the total assembly time required for the variable-speed generator/motor amounts to about one year, the construction costs are increased, and starting date of operation is often delayed, which can involve a large financial loss.

The time required for replacing a long-used rotor winding (distributed winding) with a new one will now be described. This period amounts to about six months and is six or more times as long as the time required for exchanging the rotor windings (field windings) of the constant-speed generator/motor. Therefore, it is economical risky to stop a power plant capable of generating high power of 300 MW for as long a period as six months.

Assume that unexpected damage occurs on a single rotor winding (distributed winding). Even in this case, it would take about four months to repair it, and a power plant has to be stopped accordingly.

Furthermore, if damage is caused to a rotor winding after a rotor is installed, when it is replaced with a new one, an operation of winding a binding wire on the new rotor winding is needed. It is thus necessary to always equip a power plant with a winding device including a rotating unit, resulting in an increase in installation costs and the space required for accommodation. As described above, if a supporting device, conventionally applied to a small-sized power station, is applied to a large-sized one, it adversely affects the assembly and installation of a rotor directly and indirectly, thereby increasing construction costs.

Recently a new type of supporting device has been taken into consideration in order to eliminate the aforementioned drawbacks, and is proposed in, for example, Jpn. Pat. Appln. KOKAI Publication No. 2-219430.

According to the publication, a cylindrical supporting ring is disposed around a rotor winding end portion, and they are coupled to each other by means of a number of radial-direction coupling members such as U-shaped bolts and stud bolts, thereby supporting the centrifugal force acting on the rotor winding end portion. Consequently, in this publication, some of the drawbacks of the prior art technique are overcome by reducing the area of the floor of an assembly room occupied in the power station, shortening the time required for assembling a rotor and omitting a device used exclusively for assembling the rotor, etc.

However, in order to apply the Japanese prior art to a large-sized, high-power, high-speed rotary electric-machine, a number of problems with the reliability of the support device, the economics of producing component parts of the supporting device and the like have to be eliminated. Therefore, a highly reliable and economical support device capable of being applied to a high-speed rotary electric-machine is needed. In view of these problems, the support device disclosed in the Japanese publication will now be described in detail.

In the supporting device of this publication, a number of ventilation holes and bolt penetration holes are formed in a cylindrical supporting ring in the radial directions of the supporting ring. These holes are a great hindrance to the design and manufacture of the supporting ring.

The first problem being as follows: Since the centrifugal force and external force are exerted on the supporting ring, stress is concentrated around the formed holes, and the resistance, of the supporting ring, to fatigue is considerably decreased. Therefore, reliability in terms of strength is very low.

The second problem is as follows: Since the cylindrical supporting ring is large, a great number of holes are formed on the surface of the supporting ring (e.g., about 5000 holes in the rotary electric-machine generating power of 300 MW), and the unit time for forming the holes is lengthened, thereby considerably increasing the time and cost involved in forming the holes.

The higher the revolution speed of the machine and the larger the amount of power generated therefrom, the greater the influence of the first and second hindrances. It is thus necessary to develop a reliable, economical supporting ring which is resistant to fatigue and can easily be manufactured at low cost even when it is applied to a high-speed, high-power, rotary electric-machine.

The problem of ventilation holes will now be described. As described above, a number of stud bolts or U-shaped bolts are required in order to apply the conventional supporting ring to a high-speed, high-power machine. Bolt penetration holes are formed in sequence in the supporting ring in the circumferential direction and in the axial direction perpendicular thereto. Since the supporting ring has no spaces for ventilation holes because of a great number of penetration holes, no fresh air can be circulated in a rotor to cool the rotor winding end portions. Taking any other measures to ventilate the rotor would complicate the constitution of the rotor. It is thus essential to develop a supporting ring capable of sufficient ventilation for cooling the rotor winding end portions despite a number of stud bolts or U-shaped bolts even when it is applied to a high-power, high-speed rotary electric-machine.

The contact pressure of an upper rotor winding 42A and an insulating block 426, which is caused by the centrifugal force between them, will now be considered, with reference to FIGS. 4A, 4B, and 5. Assuming that the width of the insulating block 426 is $w_b$, and that of the upper rotor winding 42A is $w_c$, their contact area is represented by $w_b \times w_c$. In FIG. 4A, numeral denotes a supporting ring, numeral 424 denotes a U-shaped ring and numeral 424 denotes a nut.

The centrifugal force exerted between the upper and lower rotor windings 42A and 42B is supported by the contact surface of the upper rotor winding 42A and insulating block 426. Thus the contact pressure, which is inversely proportional to the contact area, acts on an insulating portion of the upper rotor winding 42A.

Moreover, the contact pressure has to be prevented from exceeding a predetermined value (50 MPa or less). In order to maintain the reliability of the insulating function of the winding end portions and lengthen the lifetime thereof, it is preferable that the contact pressure should be as low as possible. It is thus desirable to arrange the insulating block 426 and U-shaped bolt 425A on the upper rotor winding 42A so as to obtain a large contact area of $w_b \times w_c$. Since, however, the U-shaped bolt 425A and insulating block 426 cross the upper rotor winding 42A in FIGS. 4A, 4B, and 5, the contact area of the given widths $w_b$ and $w_c$ is the smallest.

Particularly in a high-power, high-speed rotary electric-machine, the centrifugal force of the upper and lower rotor windings 42A and 42B is increased, as is the contact pressure thereof. Therefore, the U-shaped bolt 425A and insulating block 426 need to be arranged effectively so that the contact area of the given widths $w_b$ and $w_c$ can be enlarged.

What is more important, the bending stress of winding end portions caused by the centrifugal force has to be supported so as to have a value safe enough for the bending strength of the rotor windings, in order to maintain a good insulating function in the winding end portions for a long time. In other words, the pitch between U-shaped bolts 425A shown in, e.g., FIG. 5 has to be restricted in order to set the bending stress of the winding end portions to a proper value of 30 MPa or less in accordance with a material of the winding end portions.

The pitch between the rotor winding 42A supported by the U-shaped bolts 425A and rotor core 41, as shown in FIG. 5, has to be set at an appropriate value since the pitch influences the bending stress of the winding end portions greatly, as does the pitch between the U-shaped bolts of the same rotor winding. The difference between the former and latter pitches also has to be set at an appropriate value.

As the revolution speed of a rotary electric-machine is increased and the amount of power generated therefrom is also increased, the above pitches need to be narrowed and leveled. However, in a rotary electric-machine whose supporting ring 422 is fixed directly to a presser plate, the pitch between the rotor core 41 and U-shaped bolt 425A cannot be set to a small value because of structure restriction. It is thus difficult to cause the bending stress of the winding end portions at the end of the rotor core to fall within a tolerance.

SUMMARY OF THE INVENTION

An object of the present invention is to provide a rotor of a rotary-electric machine which is capable of leveling and reducing the mechanical stress of the end portions of distributed windings and is very economical on installation and operation.

According to a first aspect of the present invention, there is provided a rotor of a rotary electric-machine, comprising:

a rotor core;

a distributed winding wound around the rotor core;

a ring member arranged at an end of the rotor core in an axial direction and having an outside diameter which is substantially equal to an outside diameter of the rotor core; and coupling members for coupling an end portion of the distributed winding to the ring members.

According to a second aspect of the present invention, there is provided a rotor of a rotary electric-machine, comprising:

a rotor core;

a distributed winding wound around the rotor core;

a plurality of ring members arranged at an end of the rotor core in an axial direction and each having an outside diameter which is substantially equal to an outside diameter of the rotor core; and a plurality of coupling members each including a U-shaped bolt having a U-shaped portion and rod sections for leading an end portion of the distributing winding toward a center of the rotor core, and a fixture for fixing end portions of the rod sections into an inner peripheral portion of each of the plurality of ring members, the plurality of coupling members coupling the end portion of the distributed winding to the plurality of ring members, wherein the rod sections are located within an arbitrary plane including an axis of the rotor core; and a first pitch between adjacent two of the plurality of coupling members arranged in a peripheral direction is substantially equal to a second pitch between the end of the rotor core and one of the plurality of ring members nearest to the rotor core.

According to a third aspect of the present invention, there is provided a rotor of a rotary electric-machine, comprising:

a rotor core;

a distributed winding wound around the rotor core;

a plurality of ring members arranged at an end of the rotor core in an axial direction and each having an outside diameter which is substantially equal to an outside diameter of the rotor core; and a plurality of coupling members each including a U-shaped bolt having a U-shaped portion and rod sections for leading an end portion of the distributing winding toward a center of the rotor core, and a fixture for fixing end portions of the rod sections into an inner peripheral portion of each of the plurality of ring members, the plurality of coupling members coupling the end portion of the distributed winding by the plurality of ring members, wherein the rod sections are located within an arbitrary plane perpendicular to an axis of the rotor core; and a first pitch between adjacent two of the plurality of coupling members arranged in a peripheral direction is substantially equal to a second pitch between the end of the rotor core and one of the plurality of ring members nearest to the rotor core.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention and, together with the general description given above and the detailed description of the preferred embodiment given below, serve to explain the principles of the invention.

FIG. 4A is a front view of a structure of a conventional rotor winding end portion;

FIG. 4B is a side view of the structure of the conventional rotor winding end portion shown in FIG. 4A;

FIG. 5 is a plan view showing an arrangement of conventional rotor winding end portions;

FIG. 10 is a perspective view schematically showing the supporting devices of FIG. 9;

FIG. 11 is a front view of the winding end portions to which the U-shaped bolts shown in FIG. 8 have not yet been attached;

FIG. 12 is a front view of the winding end portions to which the U-shaped bolts shown in FIG. 8 have been attached;

FIG. 13 is a perspective view of the structure of a U-shaped bolt;

FIG. 23 is a view for dynamically explaining the supporting devices using the U-shaped bolts;

FIG. 25 is a diagram showing a relationship between the fixed end and its nearby reaction force, and the pitch between the supporting devices;

DESCRIPTION OF THE PREFERRED EMBODIMENT

An embodiment of the present invention will now be described, with reference to the accompanying drawings.

Figure 6:
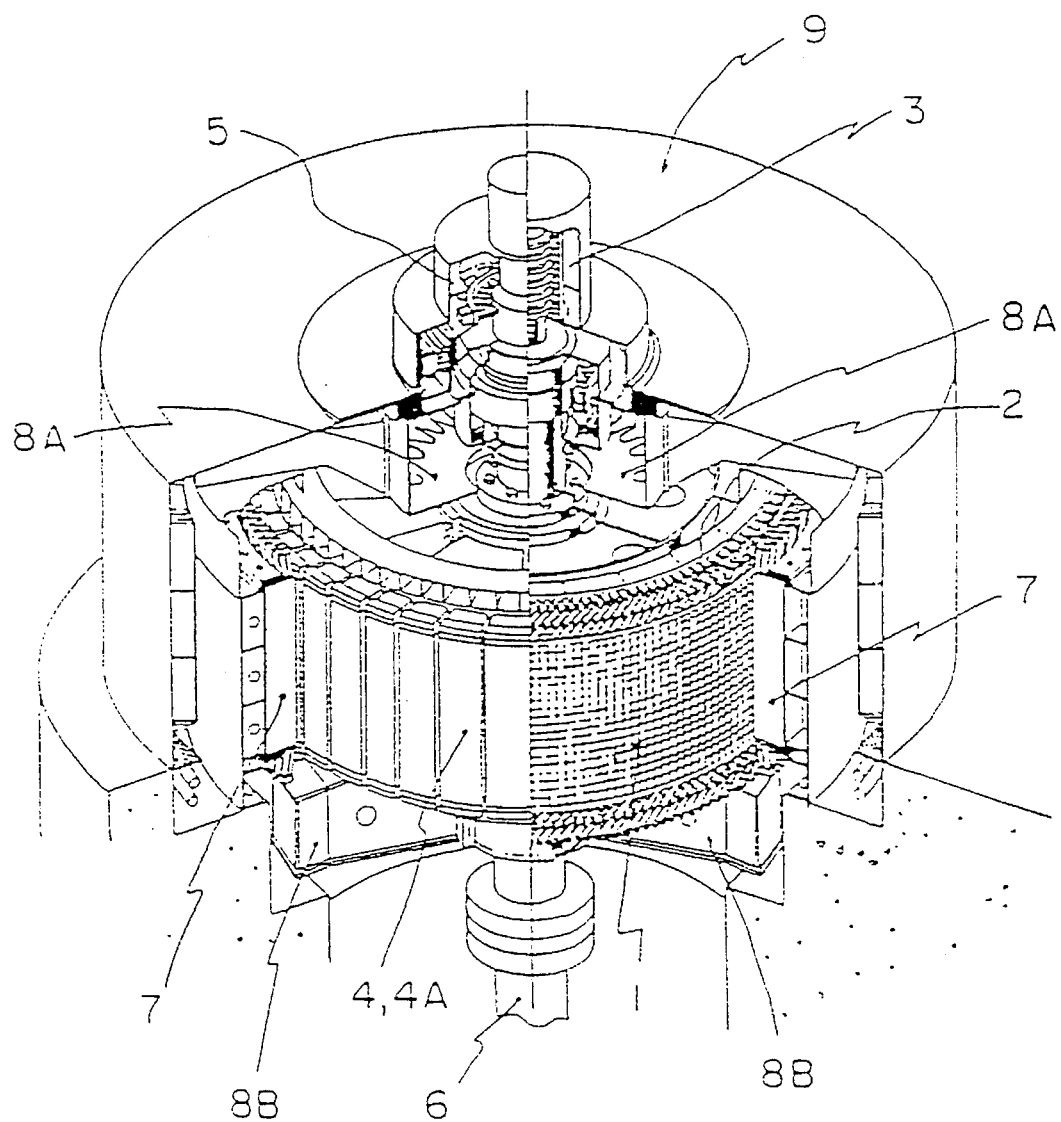
FIG. 6 is a cross-sectional view showing a structure of a pumped storage generator/motor rotated at a revolution speed of 150 rpm and generating an electric power of 85 MW.

FIG. 6 is a cross-sectional view showing a pumped storage generator/motor (vertical-shaft rotary electric-machine) having a power of 85 MW and a revolution speed of 150 rpm. While the left half of FIG. 6 illustrates a conventional constant-speed machine, the right half thereof shows a variable-speed one according to the present invention.

Figure 1:
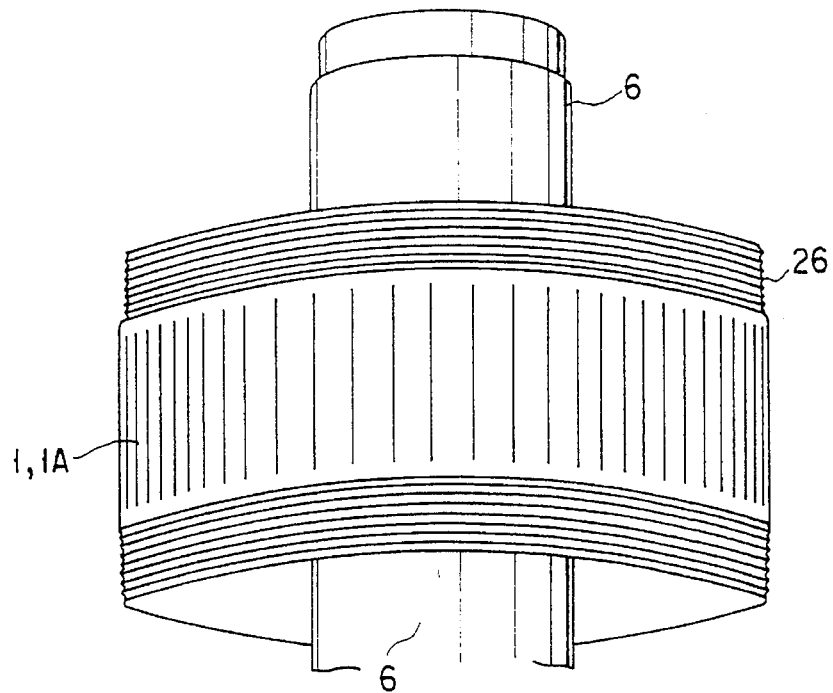
FIG. 1 is a view of the appearance of a rotor of a wound-rotor type induction motor.
Figure 2:
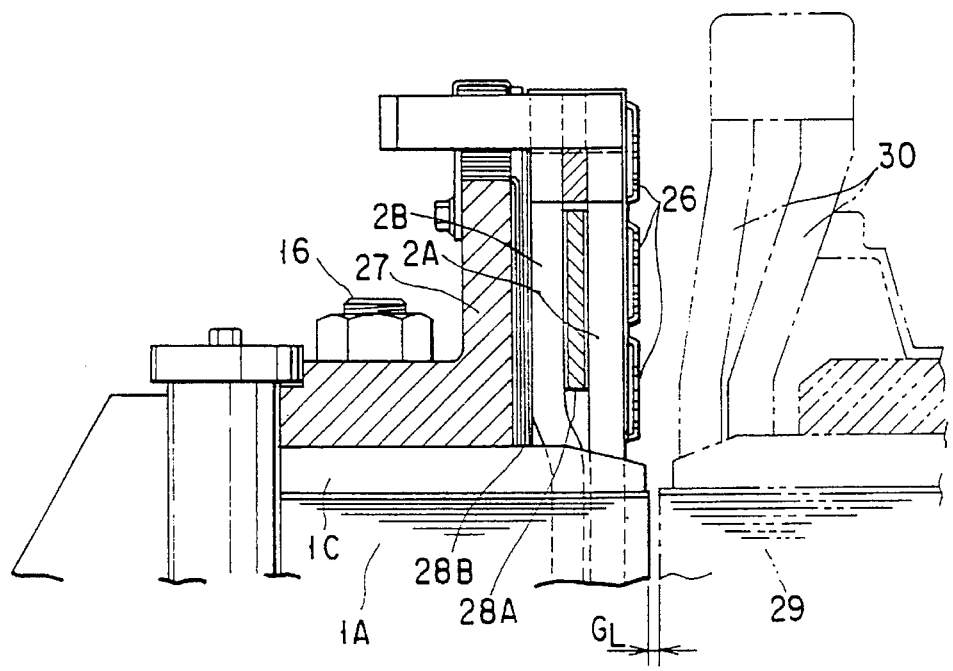
FIG. 2 is an enlarged detailed sectional view of rotor winding end portions of the rotor shown in FIG. 1.
Figure 3A:
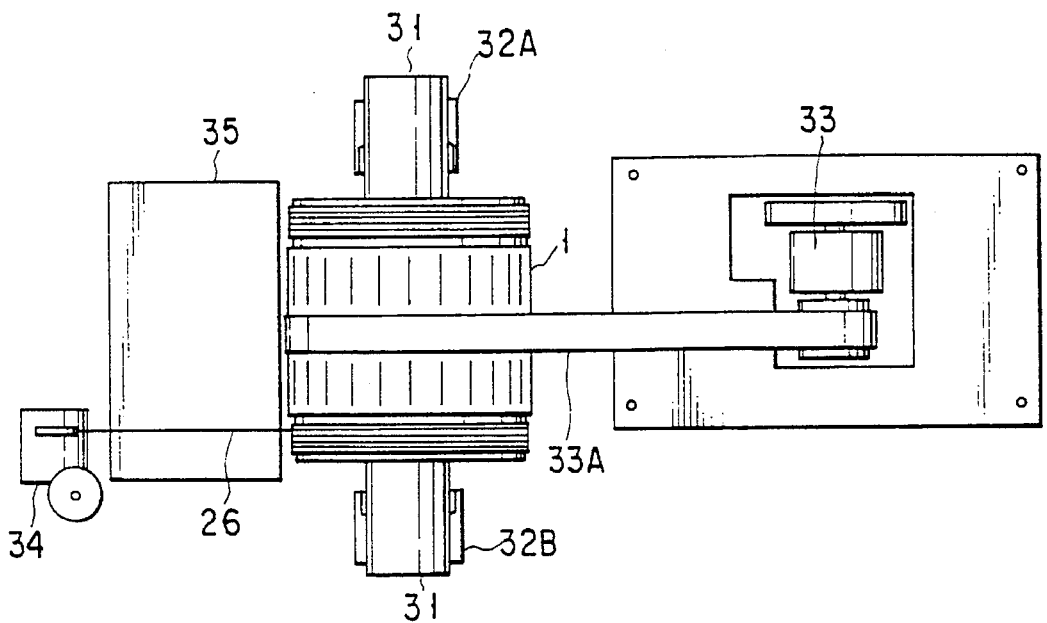
FIGS. 3A and 3B are a top view and a front view, respectively, of a rotary-electric machine analogous to the wound-rotor type induction motor, which is intended to explain a method for winding a binding wire on the rotor of the machine.
Figure 3B:
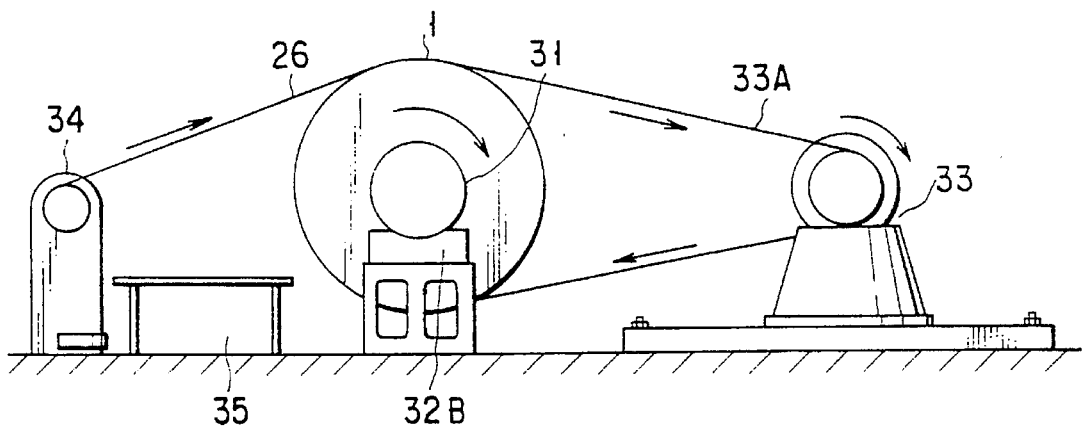
Figure 7:
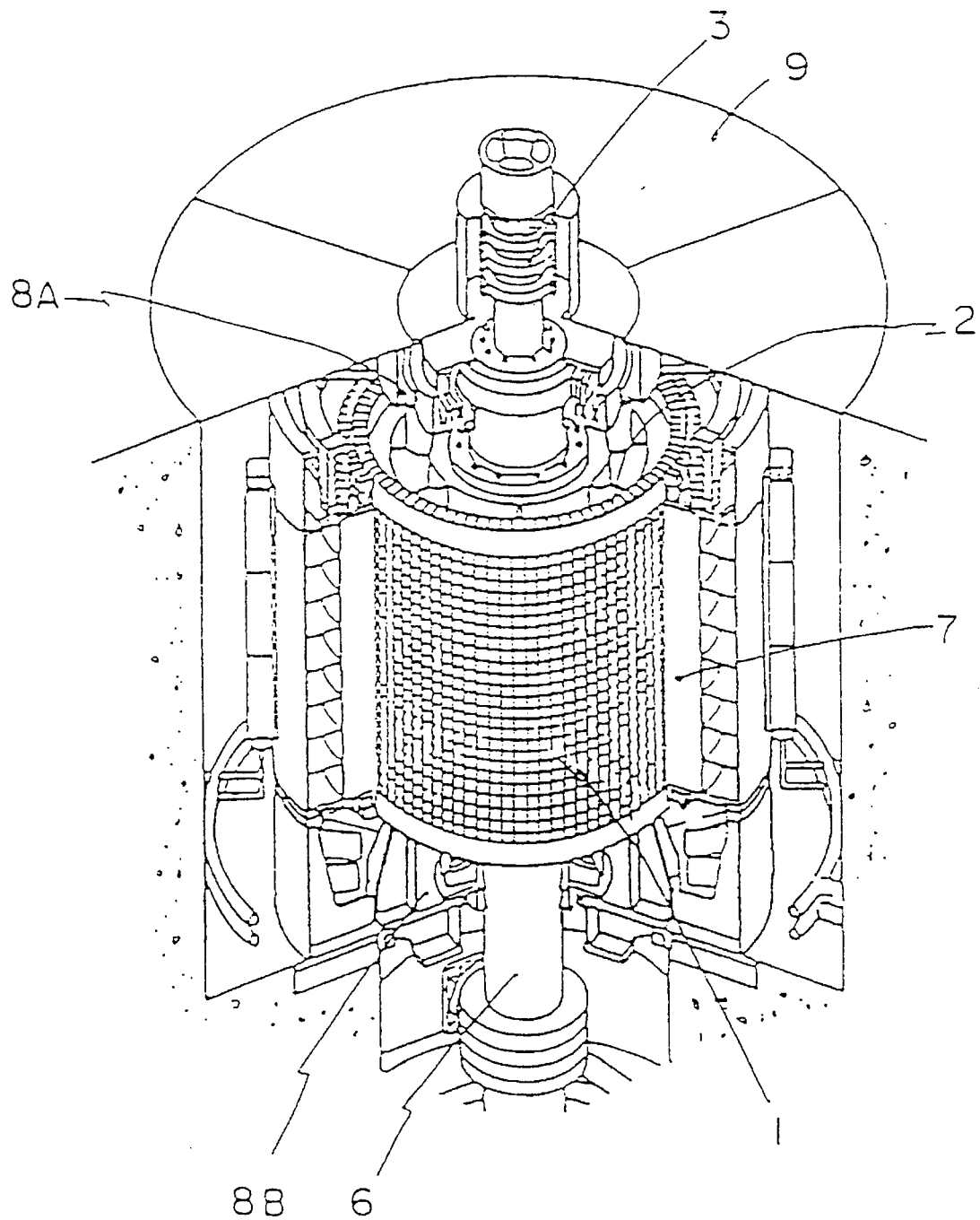
FIG. 7 is a cross-sectional view showing a structure of a variable-speed generator/motor rotating at high speed and generating high power of 300 MW.

FIG. 7 is a cross-sectional view of a pumped storage variable-speed generator/motor (vertical shaft rotary electric-machine) which rotates at high speed and generates high power of 300 MW. In this machine, the diameter of the rotor is set smaller than that of the rotor of the machine shown in FIG. 1, in order to resist the high-speed rotation, whereas the length of the rotor is increased in accordance with the high power generation.

As shown in the right half of FIG. 6 and in FIG. 7, a cylindrical rotor 1 is disposed inside a ring-shaped stator 7 covered with a ventilating duct 9. The rotor 1 includes a rotating shaft 6 and a rotor core 1A attached to the shaft 6. The rotor core 1A is wound with a three-phase distributed winding (rotor winding) 2. The rotating shaft 6 is supported by upper and lower bearing units 8A and 8B. The three-phase distributed winding (rotor winding) 2 is supplied with AC exciting power from a three-phase AC collector 3.

In the left half of FIG. 6 showing the conventional constant-speed rotary electric-machine, an ultimate rotor 4 having magnetic poles 4 wound with a concentrated winding, is provided inside a ring-shaped stator 7. The concentrated winding of the magnetic poles 4A is supplied with DC exciting power from a DC collector 5.

In summary, while the conventional machine comprises the ultimate rotor 4 having the magnetic poles 4A and the DC collector 5 for supplying DC exciting power, the machine of the present invention does the cylindrical rotor 1 wound with the three-phase rotor winding and the three-phase AC collector 3 for supplying AC exciting power.

Figure 8:
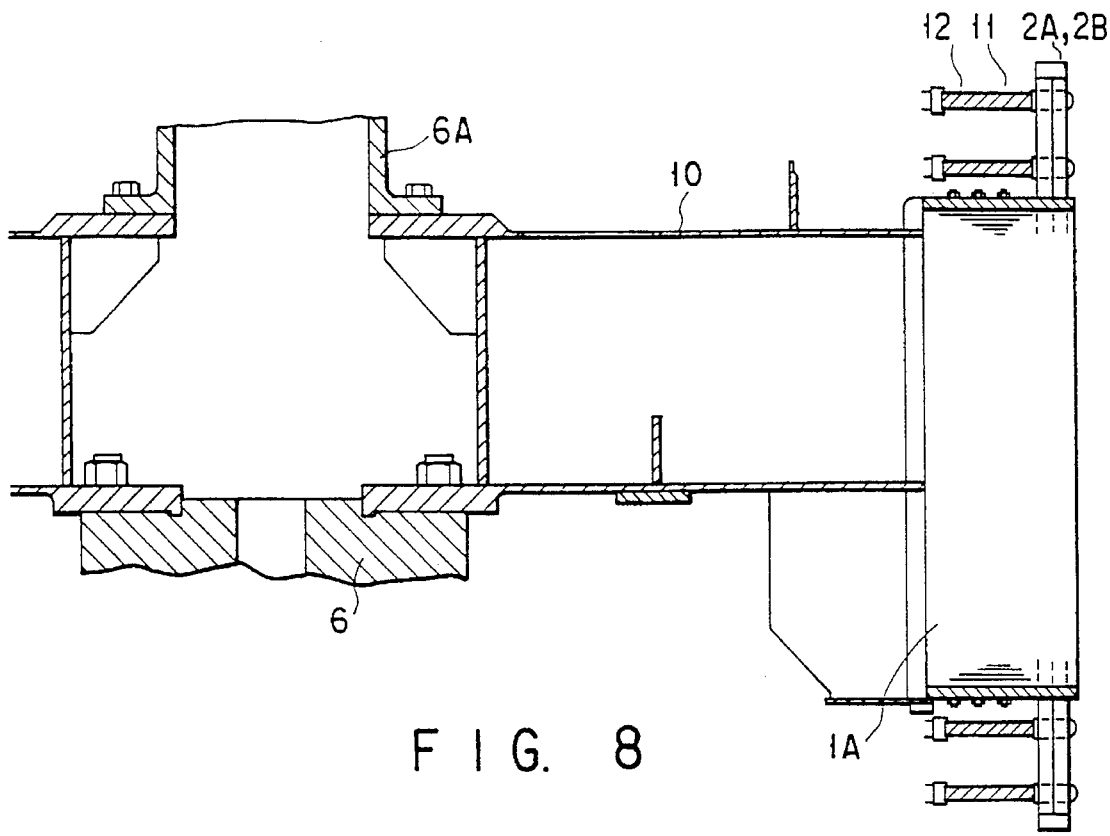
FIG. 8 is a cross-sectional view showing a structure of a rotor of a variable-speed generator/motor generating electric power of 85 MW.

FIG. 8 is a cross-sectional view of the rotor of the variable-speed generator/motor shown in the right half of FIG. 6, which is taken along the line VIII—VIII of FIG. 10. In FIG. 8, the rotor core 1A is provided with upper and lower rotor windings 2A and 2B, and a spoke 10 is coupled to an upper shaft 6a of the rotating shaft 6. The rotor core 1A is fixed to the end of the spoke 10. The rotor windings 2A and 2B are supported by a U-shaped bolt 11, and the bolt 11 is supported by a ring 12.

Figure 9:
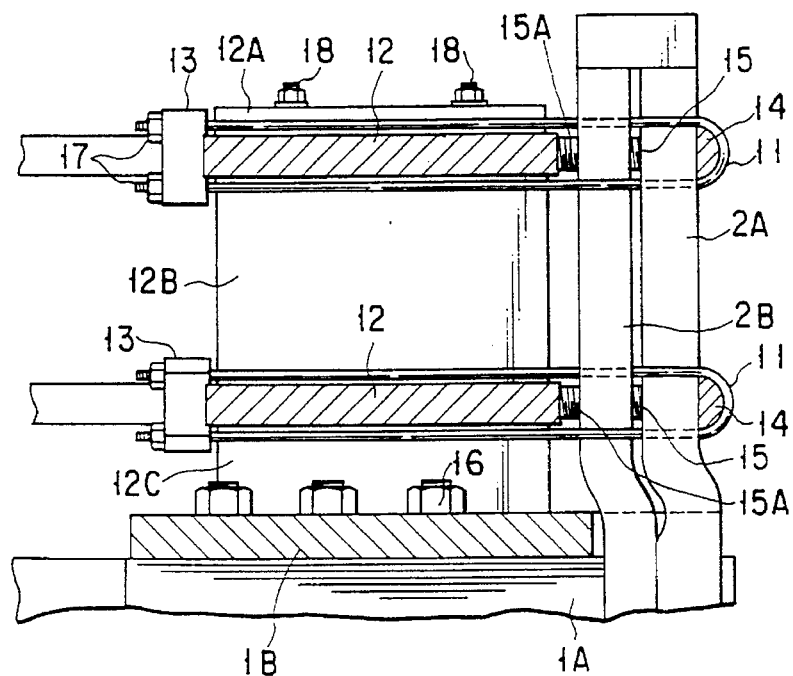
FIG. 9 is an enlarged sectional view of supporting devices for supporting rotor winding end portions of the variable-speed generator/motor shown in FIG. 8.

FIG. 9 is an enlarged sectional view of winding end portions of the rotor of the variable-speed generator/motor shown in FIG. 6, which is taken along the line IX—IX of FIG. 10. In FIG. 9, 1B a core presser plate 1B, 12A a ring presser, 12B and 12C ring spacers, 13 a saddle, 14 an insulating block, 15 a winding spacer, 16 core clamping bolt, 17 a nut for the U-shaped bolt, and 18 ring fixing bolt 18.

FIG. 10 is a perspective view schematically showing a supporting mechanism for supporting the rotor winding end portions, which is an essential part of the present invention. The relationship in spatial position among the respective component parts shown in FIGS. 6 to 9 and 11 can be understood easily. Referring to FIG. 10, the rotor 1 of this embodiment includes the rotor core 1A, distributed winding 2 wound around the core 1A, two rings 12 arranged at the end portion of the core 1A in the axial direction of the core and having substantially the same outside diameter as that of the core 1A, and a plurality of couplers 100 through which the end portion of the winding 2 is supported by the rings 12.

The rings 12 include a lower ring $12_1$ nearest to the rotor core 1A and an upper ring $12_2$.

The couplers 100, which are main components of the supporting mechanism, each include the U-shaped bolt 11, fixture 110, and insulating block 14. The U-shaped bolt 11 is constituted by a U-shaped section 11B for pulling the end portion of the winding 2 toward the rotor core 1A, and rod sections 11C (parallel sections) having screws 11A at their ends.

The fixture 110 fixes the screws 11A of the rod sections 11C of the U-shaped bolt 11 to the inner circumference of the ring 12. The fixture 110 includes the saddle 13, insulating block 14, nut 17, washer 21, and a folded washer 22.

The rod (parallel) sections 11C of U-shaped bolt 11 of each coupler 100 are located within an arbitrary plane including the axis of the rotor core 1A. The pitch between adjacent two of the couplers 100 is virtually equal to the pitch between the end of the rotor core 1A and the coupler 100 of the ring 12 nearest to the rotor core 1A.

The process of assembling the supporting mechanism will now be described. After the assembly of the rotor core 1A shown in FIG. 8 is completed, the ring 12 is assembled from its two separated semicircles or its three or more separated parts in an assembly room of a power station, in view of restrictions on size for transportation. These separated parts are combined into the ring 12 by welding.

The rings 12 ($12_1$, $12_2$) are arranged at regular intervals in their axial direction by means of the ring presser 12A and ring spacers 12B and 12C. The presser and spacers are arranged at substantially regular intervals on the peripheries of the rings. The rings 12 are fixed to the core presser plate 1B by the core clamping bolt 16. The interval between the rings 12 and the interval between the ring $12_1$ and the core presser plate 1B serve as spaces through which the U-shaped bolts 11 penetrate and ventilating ducts.

The rotor windings 2 (2A, 2B) are then inserted into winding grooves (not shown) formed in the rotor core 1A to be fixed thereinto using wedges (not shown). After that, the rotor windings 2A and 2B are connected to each of the rings 12 using the U-shaped bolt 11, saddle 13, and nut 17. The insulating block 14 is interposed between the rotor winding 2A and each of the bolts 11, and the winding spacers 15 are interposed between the upper and lower rotor windings 2A and 2B. These component parts are assembled so as not to cause any gap between them.

Referring to FIGS. 11 and 12, a finger section 1C is formed integrally with the core presser plate 1B as one component. A winding space 19 is formed opposite to the projection plane according to the radial direction of the rotor, in other words, the space 19 is formed at a crossing of the rotor windings 2A and 2B. The U-shaped bolt 11 is thus inserted in the space 19, as shown in FIGS. 9 and 12.

FIG. 13 is a stereoscopic view of part of the supporting mechanism shown in FIGS. 9 and 12. In FIG. 13, the upper rotor winding 2A, lower rotor winding 2B, U-shaped bolt 11, and ring 12 are each shown for easy understanding. The upper and lower rotor windings are fitted into the winding grooves of the rotor core 1A by wedges 20. The number of the U-shaped bolts 11 shown in FIG. 13 is the same as that of the upper rotor windings 2A in the circumferential direction of the rotor. The number of the U-shaped bolts 11 and that of the rings 12 are each one or a plurality in the axial (vertical) direction of the rotor to meet the requirements for increasing in strength.

Figure 14:
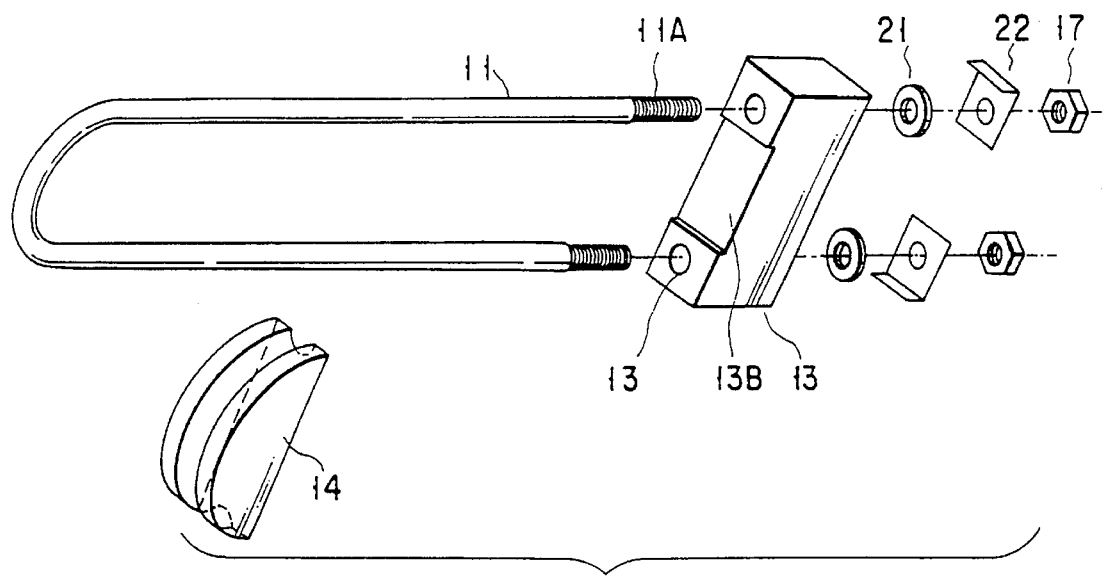
FIG. 14 is a view showing a U-shaped bolt and its peripheral component parts.

The winding end portion supporting mechanism shown in FIGS. 8, 9 and 12 is an example applied to a low-speed rotary electric-machine, and includes two U-shaped bolts 11 and two rings 12 arranged in the axial (vertical) direction. The coupler 100, which is the main part of the supporting mechanism, can be understood correctly and specifically from FIG. 14. As shown in FIG. 14, a penetration hole 13A is formed in the saddle 13, as is a groove 13B. A screw portion 11A of the end of the U-shaped bolt 11B is put through both the washer 21 and folded washer 22, and fixed into a nut 17. The saddle 13 is located such that the groove 13B is brought into contact with the inner periphery of the ring 12 (not shown). After the nut 17 is screwed, the folded washer 22 is folded toward one surface of the hexagonal nut 17, thereby preventing the coupler 100 from being loosened.

The rotor winding end portion supporting mechanism, which is applied to the rotor of the pumped storage variable-speed generator/motor rotating at high speed and generating high power of 300 MW, shown in FIG. 7, will now be described, with reference to FIG. 15. The rotor windings 2A and 2B of the rotor are larger in size as the rating power is increased, and the centrifugal force thereof is considerably strong since the rotor windings 2A and 2B are rotated at high speed. It is thus necessary to increase the number of supporting elements and the sectional area of the supporting elements applied to the rotor, as compared with the conventional ones. In the supporting mechanism shown in FIG. 15, five couplers 100 each including the U-shaped bolt 11 and ring 12 as main parts, are arranged in the vertical direction (in the axial direction of the rotor).

Figure 15:
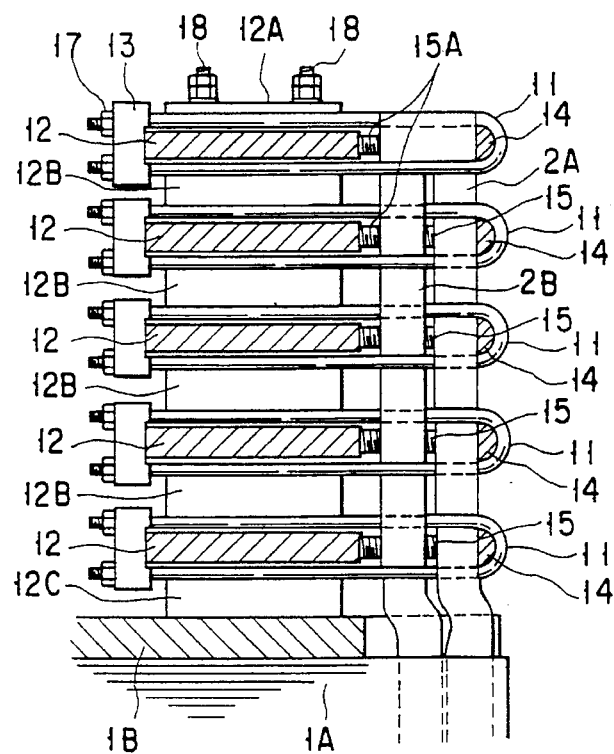
FIG. 15 is a cross-sectional view showing a structure of a supporting device for supporting the rotor winding end portions of a variable-speed generator/motor operated at high speed and generating electrical power of 300 MW.
Figure 16:
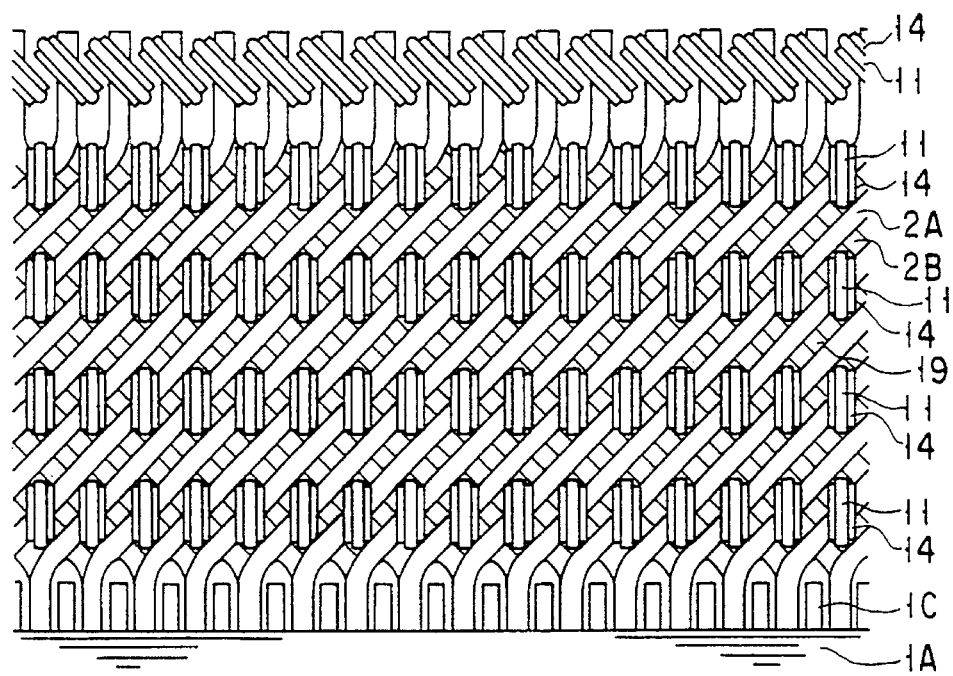
FIG. 16 is a front view of the supporting device shown in FIG. 15, as seen from the outer periphery of the rotor.
Figure 17:
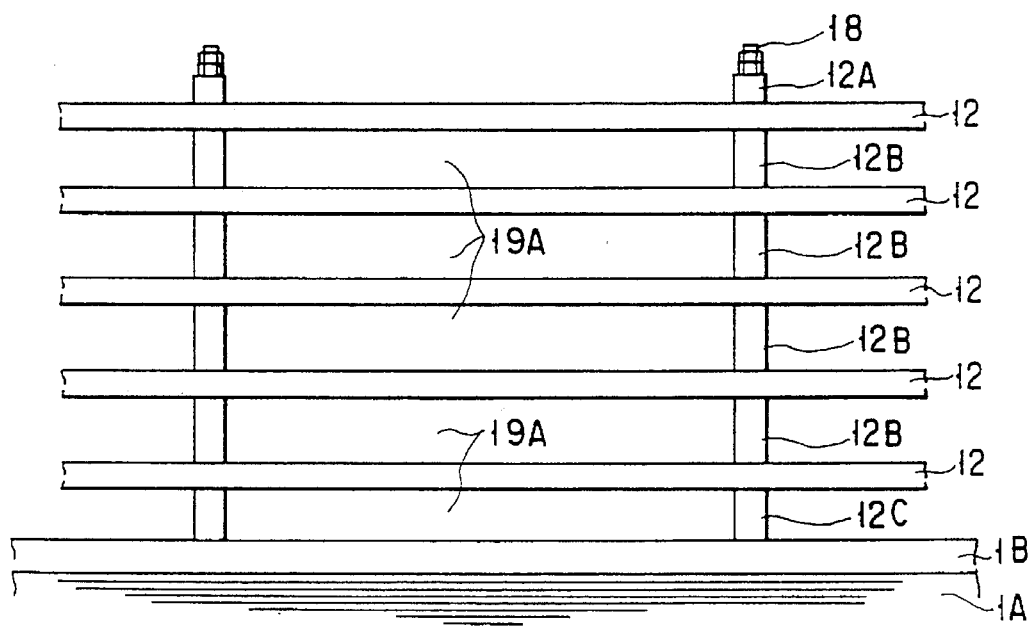
FIG. 17 is a front view of the supporting device shown in FIG. 15, as seen from the inner periphery of the rotor.
Figure 18:
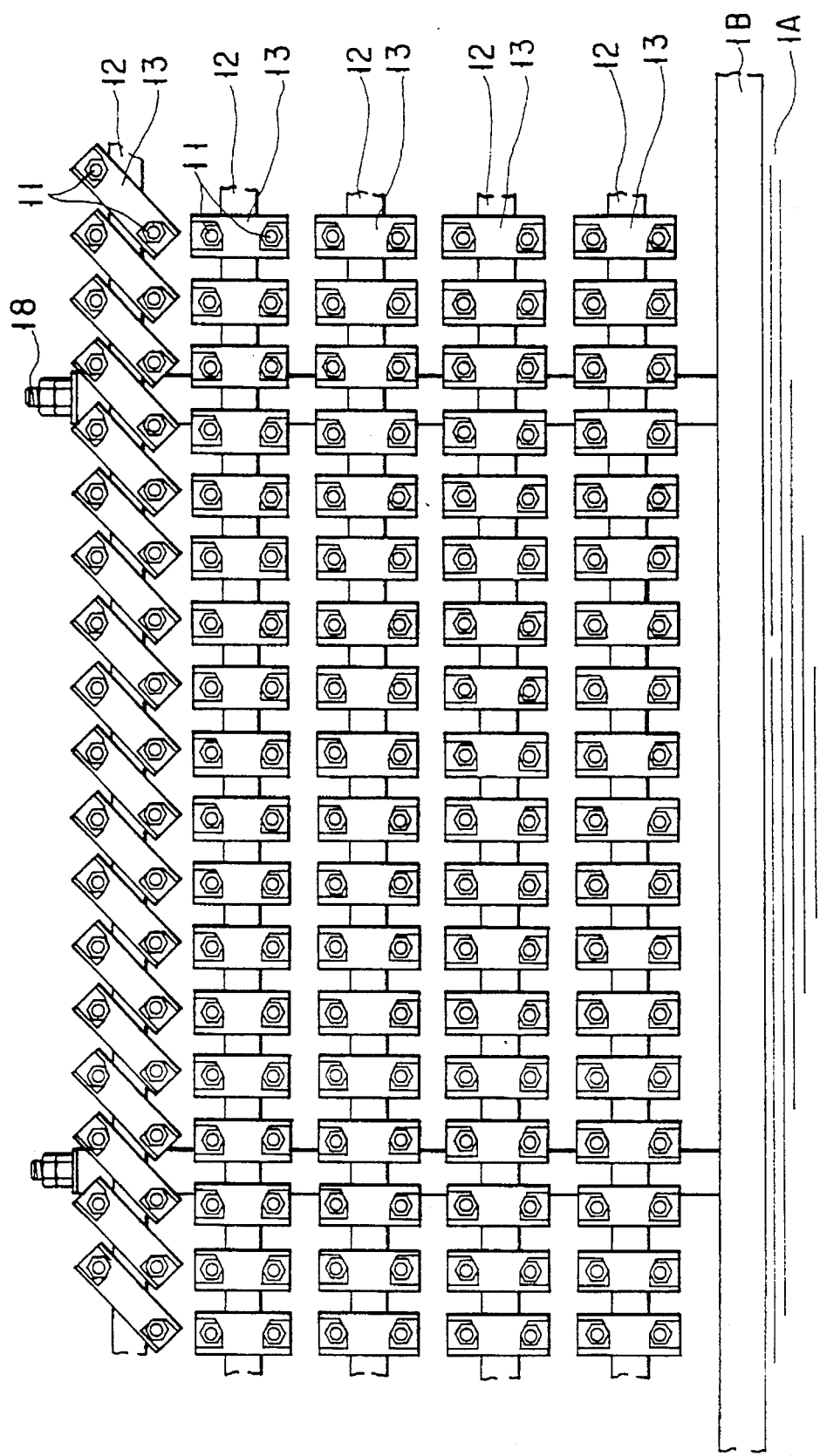
FIG. 18 is a front view of the supporting device shown in FIG. 15 to which the U-shaped bolts are attached, as seen from the outer periphery of the rotor.

The supporting mechanism shown in FIG. 15 will now be then described, with reference to FIGS. 16 to 18. As shown in FIG. 17, spaces 19A are formed in the axial direction of the rings 12 in order to allow the U-shaped bolts 11 to penetrate therethrough and ventilate the rotor. The number (m) of the rings 12 is equal to that (n) of the U-shaped bolts 11 (m=n) or is a small multiple of n, in the vertical direction, as shown in FIGS. 9, 13 and 15.

Figure 19:
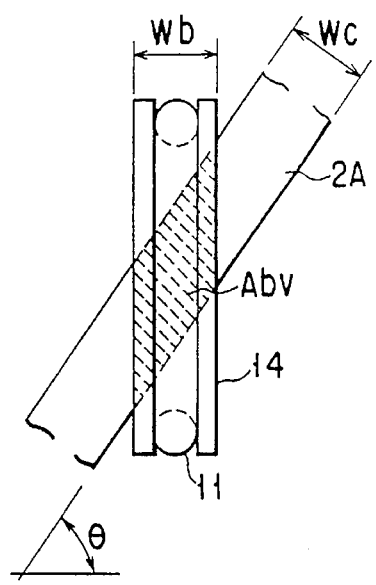
FIG. 19 is a view showing a relationship between the U-shaped bolt and winding end portion.

The relationship in relative position between the U-shaped bolt 11 and the end portion of the upper rotor winding 2A, will now be described, with reference to FIG. 19. In FIG. 19, $w_b$ the width of the insulating block 14, $w_c$ the width of the upper rotor winding 2A, $A_{bv}$ the contact area of the upper rotor winding 2A and insulating block 14, and θ an angle of the upper rotor winding 2A to the horizontal plane. As illustrated in FIGS. 16 and 19, the U-shaped bolts 11 excluding the uppermost one are arranged such that their parallel sections (rod sections 11C) are located within the vertical plane of the vertical-shaft rotary electric-machine. In other words, the U-shaped bolts are arranged such that the parallel (rod) sections 11C fall within an arbitrary plane including the axis of the rotating shaft (6 in FIGS. 6 and 7). As shown in FIG. 16, neither the uppermost U-shaped block 11 nor its corresponding insulating block 14 cross the upper rotor winding 2A.

Figure 20:
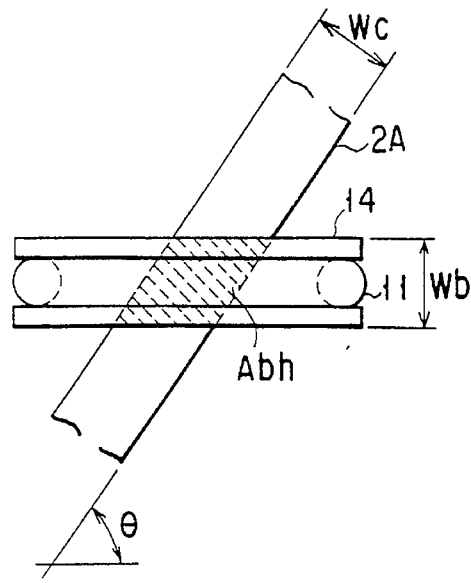
FIG. 20 is another view showing the relationship between the U-shaped bolt and winding end portion.

FIG. 20 shows another example of the relationship in relative position between the U-shaped bolt 11 and the end portion of the upper rotor winding 2A. In FIG. 20, $A_{bh}$ indicates the contact area of the upper rotor winding 2A and insulating block 14. The U-shaped bolt 11 is arranged such that its parallel section (rod section 11C) is located horizontally in the vertical-shaft rotary electric-machine, in other words, the parallel (rod) section 11C of the U-shaped bolt 11 falls within an arbitrary plane perpendicular to the axis of the rotating shaft (6 in FIGS. 6 and 7).

Figure 21:
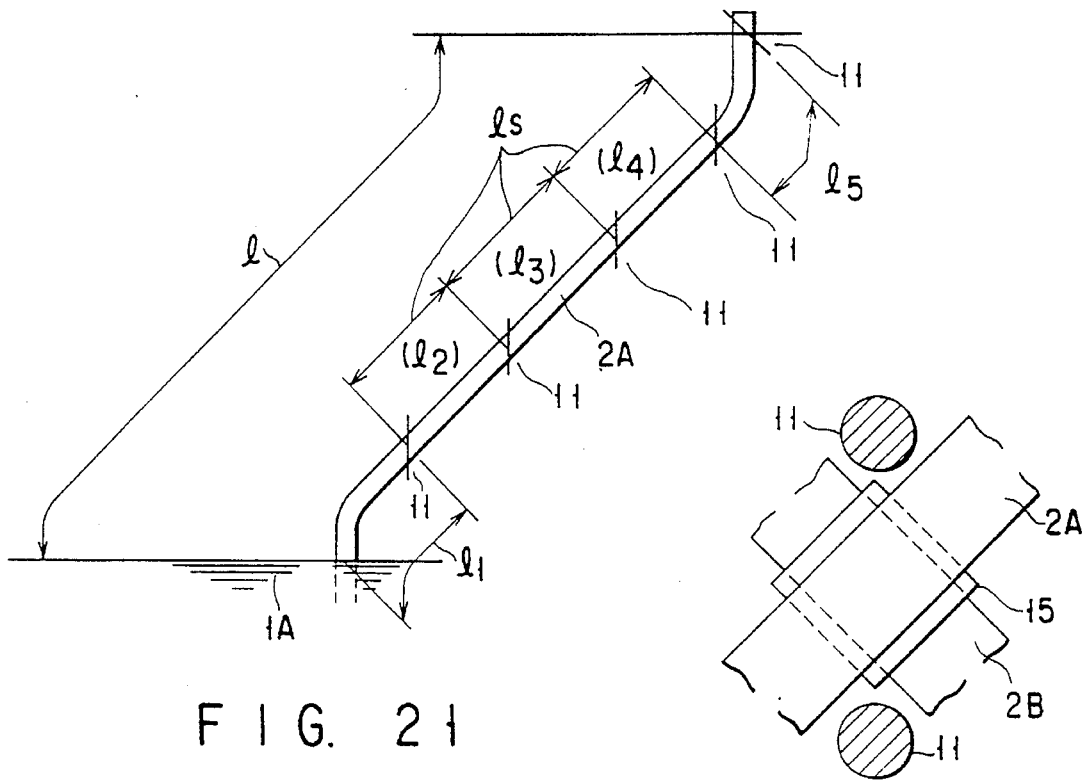
FIG. 21 is a view for explaining a pitch between the U-shaped bolts supporting the rotor winding.

FIG. 21 shows a pitch between the U-shaped bolts 11 supported by the upper rotor winding 2A. In FIG. 21, l denotes the length of the end portion of the upper rotor winding 2A, and $l_1, l_2, l_3, l_4, l_5$ and $l_S$ each indicates a pitch between the U-shaped bolts 11. The pitches $l_2, l_3$ and $l_4$ are restricted by the spaces 19 formed geometrically. However, the U-shaped bolts 11 are arranged at regular intervals $(l_2=l_3=l_4)$ on the inclined section of the winding 2A. This relationship is expressed as follows:

$$l_2=l_3=l_4=l_S$$

Neither pitch $l_1$ nor $l_5$ is restricted by the geometrically-formed spaces 19, and the U-shaped bolts 11 are arranged so as to satisfy the following expression:

$$l_1 \approx l_5 \approx l_S$$

Figure 22:
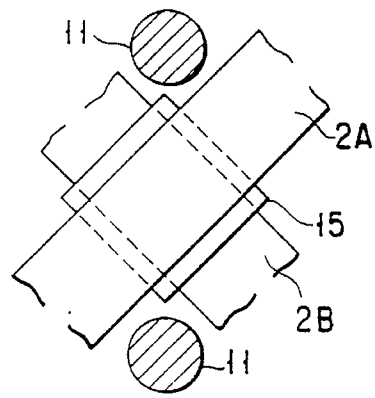
FIG. 22 is a view showing a relationship among the U-shaped bolts, upper and lower rotor windings, and a spacer between the rotor windings.

FIG. 22 is a front view in section showing a relationship between the U-shaped bolt 11 and the crossing of the upper and lower rotor windings 2A and 2B, not including the insulating block 14. In FIG. 22, the winding spacer 15 is an insulating supporting member which enables the centrifugal force of the lower rotor winding 2B to be supported by the upper rotor winding 2A. The spacer 15 is firmly fixed to both the windings 2A and 2B.

Operation of the rotor of the rotary electric-machine having the supporting mechanism described above, will now be described.

When the rotor is rotated, the centrifugal force exerted upon the rotor windings 2A and 2B protruding from the end of the rotor core 1A, is supported by the tension of the U-shaped bolts 11. At the same time, the tension of the bolts 11 is supported by the hoop force of the rings 12.

Since the rings 12 do not require a large number (about 5000) of bolt penetrating holes, which are formed conventionally, their strength against fatigue is increased, and no remarkable stress is concentrated on the rings. The supporting mechanism of the present invention therefore has very high reliability in terms of strength. Although each of the rings 12 has bolt penetrating holes through which the ring fixing bolts 18 penetrate, the number of the holes is small, as is the diameter of each hole, with the result that the holes can be formed at large intervals. Since, furthermore, the holes can be separated sufficiently from the inner and outer peripheries of the ring, the stress concentrated upon the ring is small and exercises no influence on the reliability in strength.

Since the rings 12 are arranged at regular intervals as described above, air circulates freely through each space between them. Adopting the arrangement of the rings 12, a large number of ventilation holes need not be formed in the cylindrical supporting rings of a slow-speed rotary electric-machine. In a conventional high-speed, high-power rotary electric-machine, any ventilation holes could not be formed in the cylindrical supporting rings because of restrictions on strength and space, but, in the present invention, the space between the rings 12 can be used as a ventilation hole.

Since, furthermore, the rings 12 do not necessitate a number of bolt penetration holes or ventilation holes, the time for forming these holes is unnecessary, and the time for assembling the rings 12 is shortened, and in addition the cost therefor is lowered. The productivity and economics of the supporting mechanism can thus be improved.

The upper rotor winding 2A and U-shaped bolts 11 (insulating blocks 14) are arranged so as not to cross each other. The foregoing contact areas $A_{bv}$ and $A_{bh}$ of the upper rotor winding 2A and insulating block 14 are given by the following equations:

$$A_{bv}=(w_b \times w_c)/\cos\theta$$

$$A_{bh}=(w_b \times w_c)/\sin\theta$$

In general, the angle θ of inclination ranges from 40° to 50°, and the contact area is 30 to 60% larger than that in the conventional case where the upper rotor winding and insulating block cross each other. The contact area of the rotor winding and insulating block crossing is expressed by $w_b \times w_c$.

Since the contact pressure of the upper rotor winding 2A and insulating block 14 due to the centrifugal force is decreased in inverse proportion to the contact area, the surface pressure of an insulating portion of the upper rotor winding 2A is lowered, and the insulation lifetime and reliability are improved. Using the above arrangement of the upper rotor winding 2A and U-shaped bolts 11 (insulating blocks 14), the insulating function of the rotor winding can be maintained with high reliability in the high-speed, high-power rotary electric-machine which is so designed that the surface pressure of an insulating portion is close to the limits of the mechanical strength of the insulating portion, as in the low-speed rotary electric-machine.

The pitch between the upper and lower rotor windings 2A and 2B supported by the U-shaped bolts 11, will now be described. First the relationship in strength between the centrifugal force acting on the upper rotor winding 2A and the U-shaped bolts 11 shown in FIG. 21, will be described. FIG. 23 shows a beam 23 defined by the strength of materials, and the beam is a model of the upper rotor winding 2A shown in FIG. 21. The beam 23 is fixed by its fixed end 24. The fixed end 24 of the beam 23 corresponds to the end of the rotor core 1A shown in FIG. 21. The beam 23 has supporting points 24A to 24E which correspond to the supporting positions of the U-shaped bolts 11 shown in FIG. 21.

In FIG. 23, W denotes a distributed load corresponding to the centrifugal force exerted on the upper rotor winding 2A while the rotor is rotating, $R_1$ to $R_6$ indicate the reaction force acting on the supporting points 24A to 24E or fixed end 24 of the beam 23, which corresponds to the centrifugal force supported by the U-shaped bolts 11, and $M_1$ to $M_5$ represent the moment acting on the supporting points 24A to 24D or fixed end 24 of the beam 23, which corresponds to the bending moment acting on the winding 2A.

Based on the theory of beam on the strength of materials, the results of analysis of the moment and reaction force shown in FIG. 23 will be described as follows. In calculating the moment, the term $L_{EC}$ is expressed by the following equation:

$$L_{EC} = \frac{l_1^2 - 2\frac{l_1^3 + l_S^3}{l_1} - 2l_S^2\left(10\frac{l_S}{l_1} + 9\right) + \frac{l_S^3 + l_5^3}{l_S}\left(52\frac{l_S}{l_1} + 45\right)}{45\left(\frac{l_S}{l_1} + \frac{l_5}{l_S}\right) + 52\frac{l_5}{l_1} + 39}$$

Moment $M_i$ is given by the following equations:

$$M_1 = -\frac{W}{4}\left[\frac{l_1^3 + l_S^3}{l_1} + 2l_S^2\left(3 + 8\frac{l_S}{l_1}\right) - 4\frac{l_S^3 + l_5^3}{l_S}\left(15 - \frac{l_S}{l_1}\right) + \left\{\frac{l_S}{l_1}\left(\frac{45}{2} + 26\frac{l_5}{l_S}\right) + 30\frac{l_5}{l_S} + 26\right\} \times L_{EC}\right]$$

$$M_2 = -\frac{W}{4}\left\{15\frac{l_S^3 + l_5^3}{l_S} - 6l_S^2 - \left(13 + 15\frac{l_5}{l_S}\right) \times L_{EC}\right\}$$

$$M_3 = -W\left\{\left(\frac{7}{8} + \frac{l_5}{l_S}\right) \times L_{EC} - \frac{3}{2}l_S^2\right\}$$

$$M_4 = \frac{W}{4l_S}\{(l_S^3 + l_5^3) - (l_S + l_5) \times L_{EC}\}$$

$$M_5 = -\frac{W}{8} \times L_{EC}$$

Reaction force $R_i$ is expressed by the following equations:

$$R_1 = \frac{Wl_1}{2} + \frac{M_2 - M_1}{l_1}$$

$$R_2 = \frac{W(l_1 + l_S)}{2} - \frac{M_2 - M_1}{l_1} + \frac{M_3 - M_2}{l_S}$$

$$R_3 = Wl_S - \frac{2M_3 - M_2 - M_4}{l_S}$$

$$R_4 = Wl_S - \frac{2M_4 - M_3 - M_5}{l_S}$$

$$R_5 = \frac{W(l_S + l_5)}{2} - \frac{M_5 - M_4}{l_S} + \frac{M_5}{l_5}$$

$$R_6 = \frac{Wl_5}{2} + \frac{M_5}{l_5}$$

Figure 24:
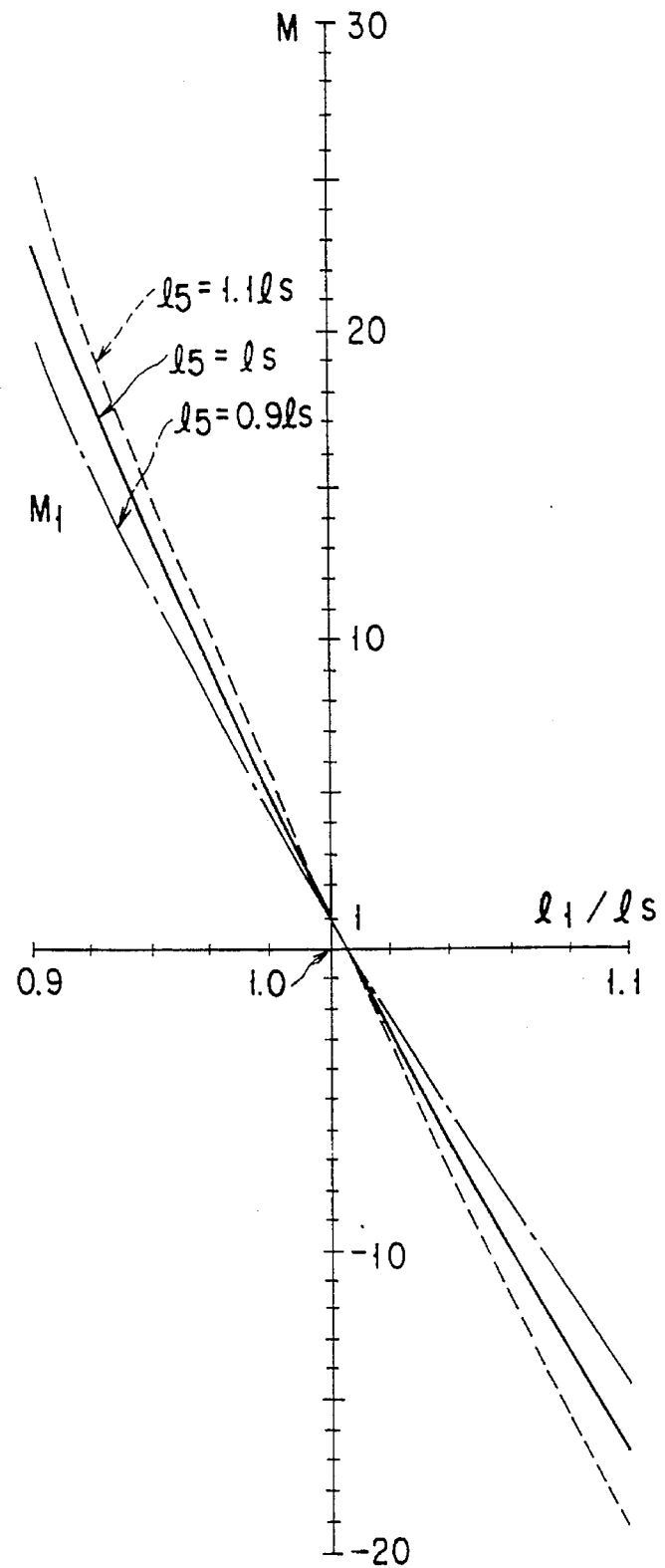
FIG. 24 is a diagram showing a relationship between the moment of a fixed end and the pitch between the supporting devices.

FIGS. 24 and 25 are graphs showing the relationships between the results of analysis indicated by the above equations and the supporting pitches. While FIG. 24 shows the relationship between the moment $M_1$ and supporting pitches $l_S$, $l_5$ and $l_S$, FIG. 25 shows the relationship between the reaction forces $R_1$ and $R_{,2}$ and supporting pitches $l_S$, $l_5$ and $l_S$.

In FIG. 24, M is the strength of moment $M_1$ and corresponds to the ratio of $M_1$ to $l_1$ when $l_1 = l_2$, and $l_1/l_2$ indicates the ratio of $l_1$ to $l_2$.

In FIG. 25, R indicates the strength of each of reaction forces $R_1$ and $R_2$, and corresponds to the ratio of each of $R_1$ and $R_2$ to $l_1$ when $l_1 = l_2$, and $l_1/l_2$ indicates the ratio of $l_1$ to $l_2$.

In FIGS. 24 and 25, the positive ordinate shows the directions of the moment and reaction force shown in FIG. 23, and the negative ordinate does their opposite directions.

The moment $M_1$ at the fixed end of the beam 23 will be considered, with reference to FIG. 24. As is apparent from FIG. 24, when the pitch $l_1$ at the fixed end is 10% different from the pitch $l_S$, the moment $M_1$ is 10 to 20 times as strong as when $l_1 = l_S$.

The reaction force $R_1$ at the fixed end and its adjacent reaction force $R_2$ will be then described, with reference to FIG. 25. As is shown in FIG. 25, when the pitch $l_1$ at the fixed end is 10% different from the pitch $l_S$, the reaction force is 2.5 to 5 times as great as when $l_1 \approx l_S$.

It is therefore understood from the above discussion that, in order to prevent the moment $M_1$ at the fixed end 24 of the beam 23 from increasing, the relationship between supporting pitches $l_1$ and $l_S$ has to be $l_1 \approx l_S$.

It is desirable to set the moment $M_1$ at the fixed end 24 equal to each of the moments $M_2$ to $M_5$ at the supporting points 24A to 24D, in view of design for the respective component parts of the rotor. Here the relationship among pitches $l_1$, $l_5$ and $l_S$ is defined as follows:

$$l_1 \approx l_5 \approx l_S$$

If this relationship is substituted into the above results of analysis to calculate the moment and reaction force at each point, the following expressions are obtained, and the moment and reaction force can be leveled accordingly.

$$M_1 \approx M_3 \approx M_5$$

$$M_2 \approx M_4 < M_1$$

$$R_2 \approx R_3 \approx R_4 \approx R_5$$

$$R_2 > R_1 > R_6$$

In view of the above, especially the relationship shown in FIG. 24, the pitches $l_1$ and $l_5$ are set as follows.

$$l_1 = 0.92 \text{ to } 1.08 l_S$$

$$l_5 = 0.92 \text{ to } 1.08 l_S$$

By doing so, the moments $M_1$ to $M_5$ and the reaction forces $R_1$ to $R_6$ can be leveled. More specifically, in the embodiment shown in FIGS. 15 and 16, the length l of the end portion of the upper rotor winding 2A and the supporting pitches $l_1$, $l_S$ and $l_5$ are determined to satisfy the foregoing conditions, so that the moment and reaction force acting on each point of the rotor winding 2A are leveled and reduced. The insulating characteristic of the distributed winding can thus be maintained with high reliability for a long time.

The supporting pitches of the upper rotor winding 2A have been described above. The same is true of the pitches of the lower rotor winding 2B. More specifically, as is apparent from FIGS. 15, 16 and 22, since the lower rotor winding 2B is supported by the U-shaped bolts 11 through the spacers 15, upper rotor winding 2A, and insulating blocks 14, the supporting pitches of the lower rotor winding 2B are equal to those of the upper rotor winding 2A, and the lower rotor winding 2B has the same reliability.

The following advantages can be obtained from the rotor of the rotary electric-machine having the rotor winding end portion supporting mechanism according to the present invention.

(1) Since the rings 12 are arranged one above another at regular intervals in its axial direction, neither U-shaped bolt penetration holes nor ventilation holes are required, and no stress is concentrated upon the rings because of the holes. Therefore, the supporting mechanism is very improved in resistance to fatigue and in reliability. Since, furthermore, no holes have to be formed, the time for producing the supporting mechanism is shortened, and the cost therefor is lowered. The supporting mechanism is very productive and economical.

(2) Since the rings 12 are employed as the principal component parts of the supporting mechanism, the length of each ring can be increased more greatly than that of the conventional cylindrical supporting ring. The supporting mechanism of the present invention can be applied to a high-speed, high-power rotary electric-machine, whereas the conventional supporting ring cannot be applied thereto.

(3) The U-shaped bolts 11 serving as component parts of the supporting mechanism, are arranged so as not to cross the rotor windings 2 to increase the contact area of the insulating blocks 14 and the rotor windings 2 and decrease the surface pressure of the insulating portion of the windings. The insulating function of the rotor windings 2 can thus be maintained with high reliability for a long time.

(4) The end portions of the rotor windings are supported by the U-shaped bolts 11 arranged at optimum intervals to level the stress acting on the supporting points of the U-shaped bolts. Similarly, The insulating function of the rotor windings 2 can be maintained with high reliability for a long time.

In the foregoing rotor of the present invention, the mechanical stress acting on the rotor winding end portions can be leveled and reduced to maintain good insulating characteristics of the windings for a long time, the resistance to fatigue can be increased to improve in reliability. Furthermore, since the rotor has a structure which is easy to produce efficiently, its productivity and economics are improved, the necessary area of an assembly room for installation and maintenance of the rotor is minimized, the time required for the assembly is shortened, and no special devices for the assembly are needed. Consequently, the rotor of the present invention is very economical on assembly and operation.

The present invention is not limited to the above embodiment, but various changes and modifications can be made as stated below.

Figure 26:
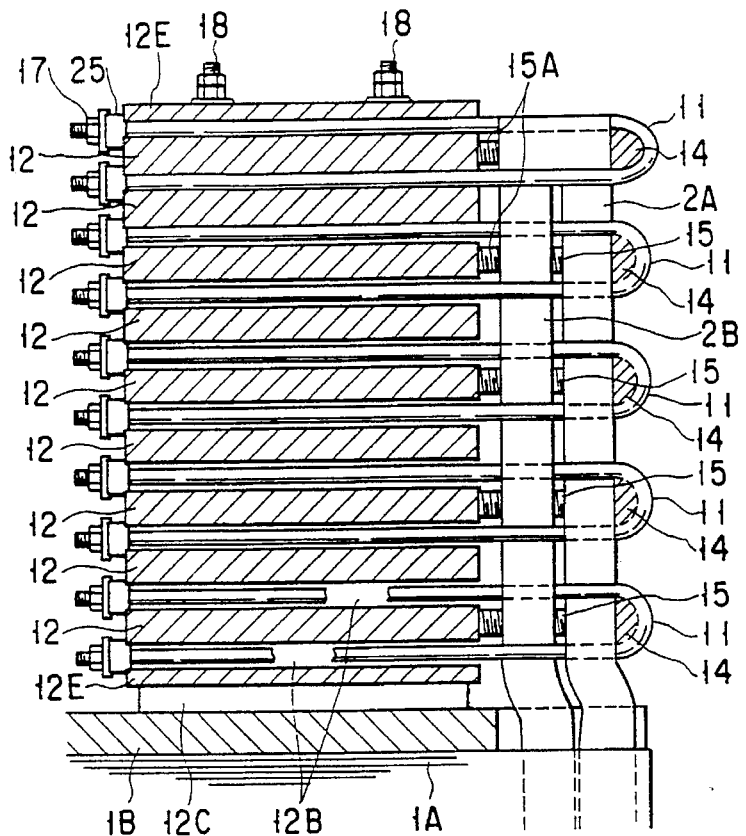
FIG. 26 is a cross-sectional view showing another arrangement of supporting devices for supporting rotor winding end portions of a variable-speed generator/motor rotating at high speed and generating high power.
Figure 27:
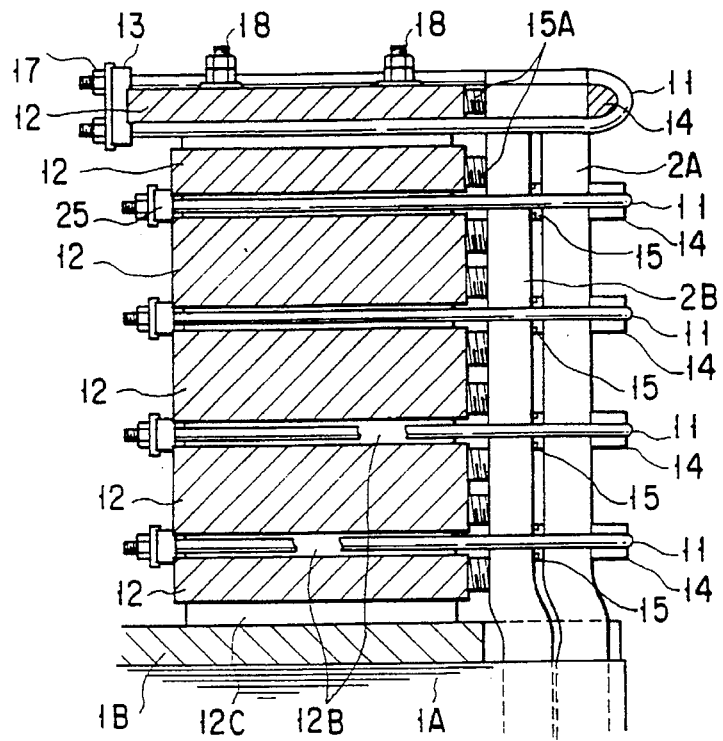
FIG. 27 is a cross-sectional view showing still another arrangement of supporting devices for supporting rotor winding end portions of a variable-speed generator/motor rotating at high speed and generating high power.
Figure 28:
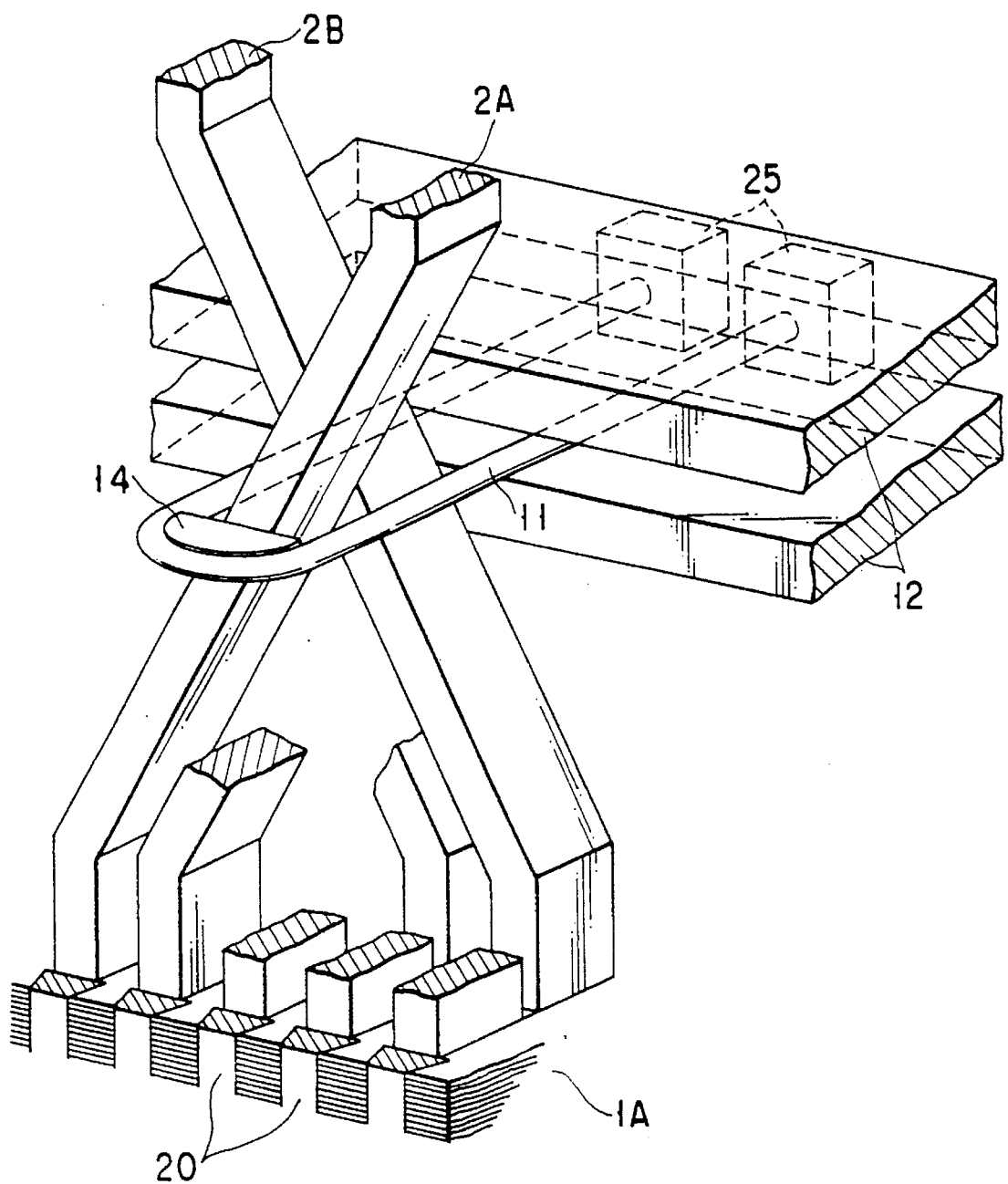
FIG. 28 is a perspective view of the structure of the supporting devices shown in FIG. 27.

FIGS. 26, 27 and 28 are views showing arrangements of supporting devices according to the other embodiments of the present invention.

FIG. 26 is a cross-sectional view showing a supporting device for supporting the rotor winding end portions which have substantially the same shape and size as those of the winding end portions 2A and 2B shown in FIG. 15 and is applicable to a higher-speed rotary electric-machine. In this figure, rings 12E are arranged at the upper and lower ends of the supporting device, respectively, and each of saddles 25 bridges adjacent two rings 12 (12 and 12E) and has a hole which the U-shaped bolt penetrates. The thickness of the ring 12E is about half of that of the ring 12. The U-shaped bolts 11 excluding the uppermost one are arranged such that their parallel sections are located within an arbitrary plane including the axis of the rotating shaft 6 of the rotary electric-machine.

If, in the arrangement of FIG. 26, the number of rings is m (=11) and the number of U-shaped bolts is n (=5), in order to keep the relation of m=2n+1, the rings are arranged separately from one another in the axial direction, with each of ring spacers 12B, 12C interposed between them, and fixed to a core presser plate 1B by ring fixing bolts 18.

FIG. 27 is a cross-sectional view showing another supporting device wherein the U-shaped bolts 11 excluding the uppermost one are arranged such that their parallel sections are located within an arbitrary plane perpendicular to the axis of the rotating shaft (not shown). If, in the arrangement of FIG. 27, the number of rings is m (=6) and the number of U-shaped bolts is n (=5), in order to keep the relation of m=n+1, the rings are arranged separately from one another in the axial direction, as in the U-shaped bolts shown in FIG. 26.

FIG. 28 is a stereoscopic view of part of the supporting device shown in FIG. 27. A stereoscopic view of the supporting device shown in FIG. 26 corresponds to that of FIG. 13.

The strength and rigidity of the rings 12E and 12 shown in FIGS. 26 and 27 are made greater than those of the rings shown in FIG. 15 by increasing in space factor particularly in the axial direction of the rotating shaft, and the rings can be applied to a higher-speed rotary electric-machine.

In the above embodiments, a plurality of U-shaped bolts are arranged one above another in the axial direction. However, in a very low-speed rotary electric machine, the number of the U-shaped bolts shown in FIG. 9 and FIG. 15 can be decreased to one, unless any inconvenience occurs in the winding end portions.

In the above embodiments, the upper and lower rotor windings 2A and 2B are supported by their common U-shaped bolt 11. However, these rotor windings can be supported by their respective U-shaped bolts and, in this case, the same advantages can be obtained.

In the above embodiments, the U-shaped bolts 11 are used as a connecting member for connecting the rotor windings and rings. However, even though the connecting member can be replaced with a belt-like member such as a cord and a tape, the same advantages as above can be obtained.

In the above embodiments, in each of the rotor windings, the pitch between the end of the rotor core and its nearest U-shaped bolt is virtually equal to the pitch between adjacent two of the U-shaped bolts. However, if a difference between these pitches is 8% or less, the same advantages as above can be obtained.

As described above, according to the present invention, a rotor winding end portion supporting mechanism which is improved in reliability, productivity, and economics, can be constituted in a rotor of a rotary electric-machine wound with a three-phase distributed winding. The supporting mechanism of the present invention can be applied to a high-speed, high-power rotary electric-machine. In assembling the supporting mechanism, neither special assembly devices nor special tools are required, unlike the conventional supporting mechanism having a binding wire, nor is a large assembly room. The time required for assembling it can be shortened. Even when an accident occurs on a rotor winding during the operation of the rotary electric-machine, it can be replaced with a new one for a very short time, and the interruption of the operation can be shortened, thereby maintaining a high availability factor of the rotary electric-machine.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A rotor of a rotary electric-machine, comprising;

rotor core;

a distributed winding wound around said rotor core;

a plurality of ring members arranged at an end of said rotor core in an axial direction and each having an outside diameter which is substantially equal to an outside diameter of said rotor core; and a plurality of coupling members each including a U-shaped bolt having a U-shaped portion and rod sections leading an end portion of said distributing winding toward a center of said rotor core, and a fixture fixing end portions of the rod sections into an inner peripheral portion of each of said plurality of ring members, said plurality of coupling members coupling the end portion of said distributed winding to said plurality of ring members, wherein said rod sections are located within an arbitrary plane including an axis of said rotor core;

a first circumferential pitch between two adjacent coupling members of said plurality of coupling members arranged in a peripheral direction is substantially equal to a second circumferential pitch between the end of said rotor core and one of said plurality of ring members nearest to said rotor core, and the number m of said plurality of ring members is a small multiple of the number n of said plurality coupling members.

2. The rotor according to claim 1, wherein a difference between said first and second circumferential pitches is set at 8% or less.

3. A rotor of a rotary electric-machine, comprising:

rotor core;

a distributed winding wound around said rotor core;

a plurality of ring members arranged at an end of said rotor core in an axial direction and each having an outside diameter which is substantially equal to an outside diameter of said rotor core; and a plurality of coupling members each including a U-shaped bolt having a U-shaped portion and rod sections leading an end portion of said distributing winding toward a center of said rotor core, and a fixture fixing end portions of the rod sections into an inner peripheral portion of each of said plurality of ring members, said plurality of coupling members coupling the end portion of said distributed winding by said plurality of ring members, wherein said rod sections are located within an arbitrary plane perpendicular to an axis of said rotor core;

a first circumferential pitch between two adjacent coupling members of said plurality of coupling members arranged in a peripheral direction is substantially equal to a second circumferential pitch between the end of said rotor core and one of said plurality of ring members nearest to said rotor core, and the number m of said plurality of ring members is a small multiple of the number n of said plurality of coupling members.

4. The rotor according to claim 3, wherein a difference between said first and second circumferential pitches is set at 8% or less.

5. A rotor of a rotary electric-machine, comprising:

rotor core;

a distributed winding wound around said rotor core;

a plurality of ring members arranged at an end of said rotor core in an axial direction and each having outside diameter which is substantially equal to an outside diameter of said rotor core; and a plurality of coupling members each including a U-shaped bolt having a U-shaped portion and rod sections leading an end portion of said distributing winding toward a center of said rotor core, and a fixture fixing end portions of the rod sections into an inner peripheral portion of each of said plurality of ring members, said plurality of coupling members coupling the end portion of said distributed winding to said plurality of ring members, wherein said rod sections are located within an arbitrary plane including an axis of said rotor core;

a first circumferential pitch between adjacent two coupling members of said plurality of coupling members arranged in a peripheral direction is substantially equal to a second circumferential pitch between the end of said rotor core and one of said plurality of ring members nearest to said rotor core, and the number m of said plurality of ring members is n+1, wherein n is the number of said plurality of coupling members.

6. The rotor according to claim 5, wherein a difference between said first and second circumferential pitches is set at 8% or less.

7. A rotor of a rotary electric-machine, comprising:

a rotor core;

a distributed winding wound around said rotor core;

a plurality of ring members arranged at an end of said rotor core in an axial direction and each having an outside diameter which is substantially equal to an outside diameter of said rotor core; and a plurality of coupling members each including a U-shaped bolt having a U-shaped portion and rod sections leading an end portion of said distributing winding toward a center of said rotor core, and a fixture fixing end portions of the rod sections into an inner peripheral portion of each of said plurality of ring members, said plurality of coupling members coupling the end portion of said distributed winding to said plurality of ring members, wherein said rod sections are located within an arbitrary plane including an axis of said rotor core;

a first circumferential pitch between adjacent two coupling members of said plurality of coupling members arranged in a peripheral direction is substantially equal to a second circumferential pitch between the end of said rotor core and one of said plurality of ring members nearest to said rotor core, and the number m of said plurality of ring members is 2n+1 wherein n is the number of said plurality of coupling members.

8. The rotor according to claim 7, wherein a difference between said first and second circumferential pitches is set at 8% or less.

9. A rotor of a rotary electric-machine, comprising:

a rotor core;

a distributed winding wound around said rotor core;

a plurality of ring members arranged at an end of said rotor core in an axial direction and each having an outside diameter which is substantially equal to an outside diameter of said rotor core; and a plurality of coupling members each including a U-shaped bolt having a U-shaped portion and rod sections leading an end portion of said distributing winding toward a center of said rotor core, and a fixture fixing end portions of the rod sections into an inner peripheral portion of each of said plurality of ring members, said plurality of coupling members coupling the end portion of said distributed winding by said plurality of ring members, wherein said rod sections are located within an arbitrary plane perpendicular to an axis of said rotor core;

a first circumferential pitch between adjacent two of said plurality of coupling members arranged in a peripheral direction is substantially equal to a second circumferential pitch between the end of said rotor core and one of said plurality of ring members nearest to said rotor core, and the number m of said plurality of ring members is n+1, wherein n is the number of said plurality of coupling members.

10. A rotor of a rotary electric-machine, comprising:

a rotor core;

a distributed winding wound around said rotor core;

a plurality of ring members arranged at an end of said rotor core in an axial direction and each having an outside diameter which is substantially equal to an outside diameter of said rotor core; and a plurality of coupling members each including a U-shaped bolt having a U-shaped portion and rod sections leading an end portion of said distributing winding toward a center of said rotor core, and a fixture fixing end portions of the rod sections into an inner peripheral portion of each of said plurality of ring members, said plurality of coupling members coupling the end portion of said distributed winding by said plurality of ring members, wherein said rod sections are located within an arbitrary plane perpendicular to an axis of said rotor core;

a first circumferential pitch between adjacent two of said plurality of coupling members arranged in a peripheral direction is substantially equal to a second circumferential pitch between the end of said rotor core and one of said plurality of ring members nearest to said rotor core, and the number m of said plurality of ring members is 2n+1, wherein n is the number of said plurality of coupling members.

11. The rotor according to claim 10, wherein a difference between said first and second circumferential pitches is set at 8% or less.

12. The rotor according to claim 3, wherein a difference between said first and second circumferential pitches is set at 8% or less.

* * * * *